United States Patent [19]
Kameo et al.

[11] Patent Number: 5,533,060
[45] Date of Patent: Jul. 2, 1996

[54] MULTI-PHASE PSK SIGNAL DECODER INCLUDING PHASE DISPLAY GENERATOR WITH PHASE CORRECTING FEEDBACK

[75] Inventors: Yohdoh Kameo, Yokohama; Kazuo Matsumoto, Sagamihara; Jun Suzuki, Sakura, all of Japan

[73] Assignee: Satellite Communication Laboratory Co., Ltd., Japan

[21] Appl. No.: 358,107

[22] Filed: Dec. 16, 1994

[30] Foreign Application Priority Data

Dec. 16, 1993 [JP] Japan .................................. 5-343541

[51] Int. Cl.$^6$ .................................................. H03D 3/22
[52] U.S. Cl. .......................... 375/332; 329/306; 329/304; 375/324; 375/344
[58] Field of Search .................................. 375/322, 332, 375/326, 329, 331, 355, 344, 345, 324, 325, 327, 279, 280, 281, 340; 329/304, 306, 308, 307

[56] References Cited

U.S. PATENT DOCUMENTS

| | | | |
|---|---|---|---|
| 4,866,395 | 9/1989 | Hostetter | 329/309 |
| 4,871,973 | 10/1989 | Yoshihara | 329/308 |
| 4,912,422 | 3/1990 | Kobayashi et al. | 329/206 |
| 4,949,356 | 8/1990 | Long | 375/332 |
| 4,959,619 | 9/1990 | Delacroix et al. | 329/206 |
| 5,138,272 | 8/1992 | Le Polozec et al. | 329/304 |
| 5,172,229 | 12/1992 | Baker | 348/146 |
| 5,179,731 | 6/1993 | Trankle et al. | 455/291 |
| 5,265,126 | 11/1993 | Yoshikawa | 375/244 |
| 5,398,002 | 3/1995 | Bang | 329/302 |

OTHER PUBLICATIONS

Floyd M. Gardner, "Phaselock Techniques", pp. 215–251, A Wiley–Interscience Publication, John Wiley & Sons, Second Edition.

Sadao Takenaka, "Carrier Recovery Circuit & Demodulator", 28 Dec. 1984, abstract.

Yasushi Sugita, "Digital Demodulation Circuit", 5 Oct. 1992, abstract.

Takeya Kamakura, "Demodulator", 28 May 1992, abstract.

*Primary Examiner*—Young T. Tse
*Assistant Examiner*—William Luther
*Attorney, Agent, or Firm*—Sixbey, Friedman, Leedom & Ferguson; Gerald J. Ferguson, Jr.; Karlton C. Butts

[57] ABSTRACT

A digitized quasi-phase synchronous phase detecting signal of the PSK signal is used to generate digitized quasi-synchronous phase detecting signal phase-corrected by phase correcting data and a first phase display data indicating the phase of the carrier of the PSK signal is generated from the phase-corrected digitized quasi-synchronous phase detecting signal. Alternatively, the digitized quasi-synchronous phase detecting signal of the PSK signal is used to generate second phase display data indicating the phase of the carrier of the PSK signal and third phase-corrected phase display data is generated from the second phase display data. The first or third phase display data is used to generate fourth phase display data indicating the phase assigned to the code of the PSK signal and a decoded digitized code is generated from the fourth phase display data. When signal presence display information is in its state to indicate the amplitude of the PSK signal is larger than a predetermined threshold, the frequency and phase of the carrier of the PSK signal are predicted using their estimated frequency and phase based on the first or second and fourth phase display data. When the signal presence display information transitions to its state to indicate that the amplitude of the PSK signal is smaller than the predetermined threshold, the frequency and phase estimated until then are used to predict the frequency and phase of the carrier of the PSK signal and phase data in the predicted frequency and phase data is generated as the phase correcting data.

6 Claims, 7 Drawing Sheets

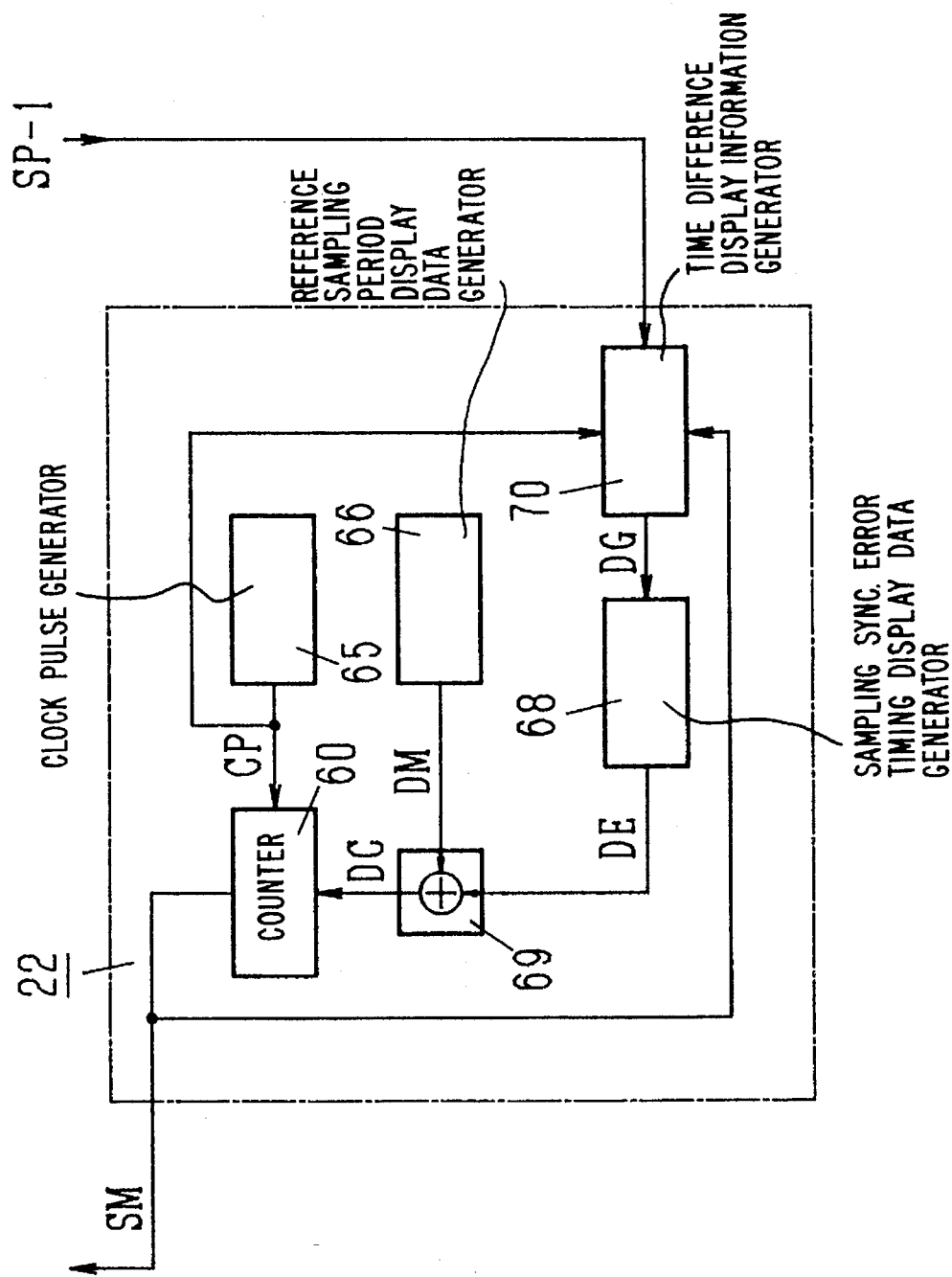

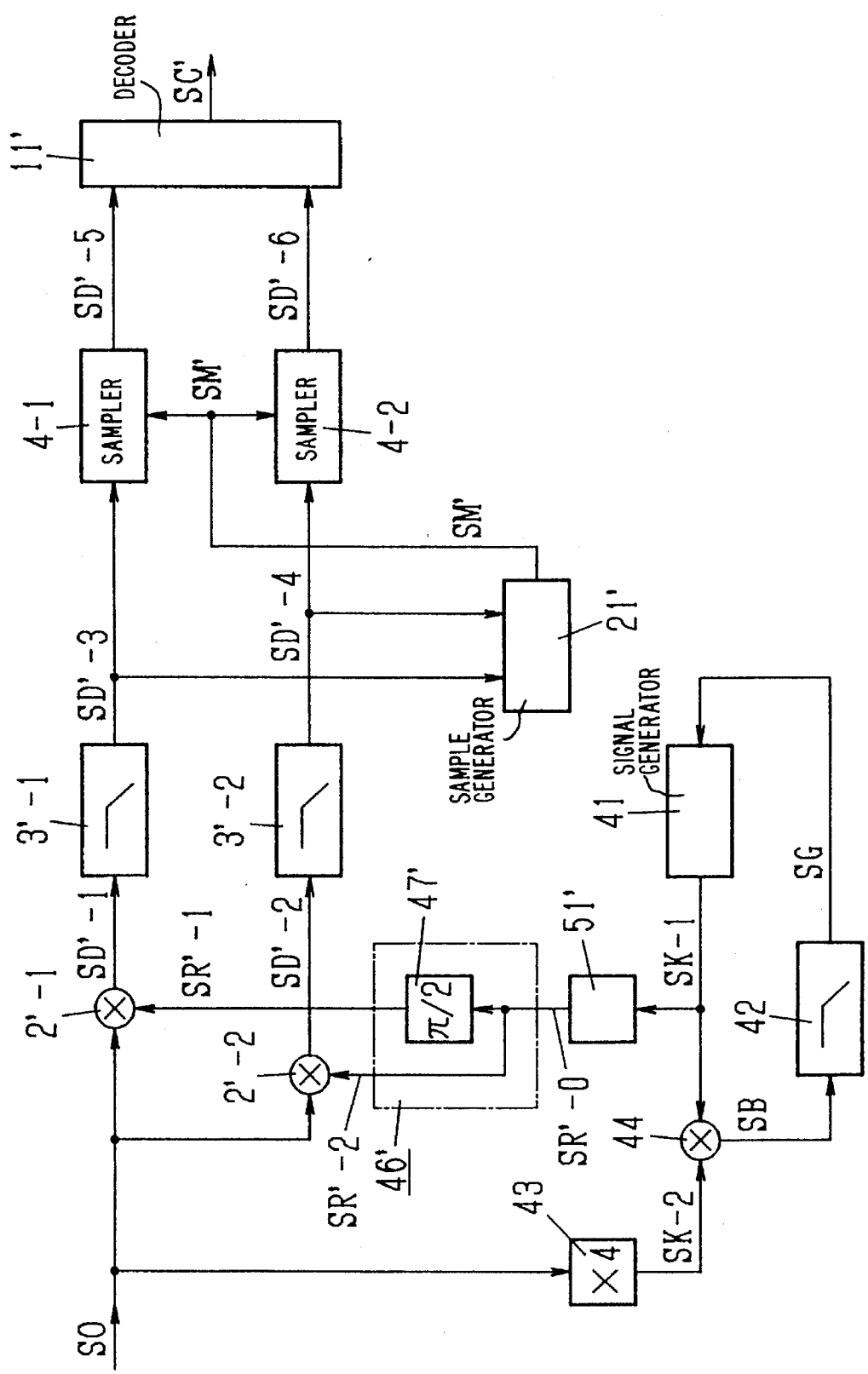

MULTI-PHASE PSK SIGNAL DECODER INCLUDING PHASE DISPLAY GENERATOR WITH PHASE CORRECTING FEEDBACK

BACKGROUND OF THE INVENTION

1. Field of the Invention

The present invention relates to a multi-phase PSK signal decoder and, more particularly, to a multi-phase PSK signal decoder which decodes digital codes of a multi-phase PSK signal.

2. Description of the Prior Art

There has been proposed a four-phase PSK signal decoder which will hereunder be described with reference to FIG. 7.

The conventional four-phase PSK signal decoder comprises: first and second synchronous phase detecting means 2'-1 and 2'-2; first and second low-pass filter means 3'-1 and 3'-2; first and second sampling means 4-1 and 4-2; decoded digital code generating means 11'; sampling signal generating means 21'; signal generating means 41 and 43 for generating signals which are used to generate phase detecting signals; signal generating means 44 for generating a signal which is used to generate an oscillation control signal; low-pass filter means 42; and phase detecting reference signal generating means 51' and 46'.

The first and second synchronous phase detecting means 2'-1 and 2'-2 are supplied with a common four-phase PSK signal SO and first and second phase detecting reference signals SR'-1 and SR'-2 available from the phase detecting reference signal generating means 46' and output first and second synchronous-phase-detected signals SD'-1 and SD'-2 synchronously detected by first and second phase detecting reference signals SR'-1 and SD'-2 of the phase of the carrier of the four-phase PSK signal SO.

The first synchronous phase detecting means 2'-1 has the function of a multiplier which is supplied with the four-phase PSK signal SO and the first phase detecting reference signal SR'-1. Similarly, the second synchronous phase detecting means 2'-2 has the function of a multiplier which is supplied with the four-phase PSK signal SO and the second phase detecting reference signal SR'-2.

Assuming, for the sake of brevity, that the initial phase of its carrier is zero, the four-phase PSK signal SO is generally expressed by the following equation.

$$SO = A \cos(\omega t + \theta(t)) + n(t) \tag{101}$$

where A is the amplitude, ω the angular frequency of the carrier, t time, θ(t) the phase of the code (the symbol) representing communication information at time t and n(t) noise at time t.

The first and second phase detecting reference signals SR'-1 and SR'-2 are generally expressed by Eqs. (103-1) and (103-2) described later on.

The first and second synchronous phase detecting signals SD'-1 and SD'-2 are generally expressed by Eqs. (104-1) and (104-2) on the basis of Eqs. (101), (103-1) and (103-2).

$$SD'\text{-}1 = A\{\cos(\Delta\omega t - \epsilon_a + \theta(t)) - \cos(2\omega t + \Delta\omega t + \epsilon_a + \theta(t))\} + n(t) \cos(\omega t + \epsilon_a) \tag{104-1}$$

$$SD'\text{-}2 = A\{\sin(\Delta\omega t - \epsilon_a + \theta(t)) - \sin(2\omega t + \Delta\omega t + \epsilon_a + \theta(t))\} + n(t) \sin(\omega t + \epsilon_a) \tag{104-2}$$

In Eqs. (104-1) and (104-2), Δω is expressed by the difference between the angular frequency ω of the carrier of the four-phase PSK signal SO and angular frequencies of the first and second phase detecting reference signals SR'-1 and SR'-2. $\epsilon_a$ is error phase and n (t) is noise at time t. For the sake of brevity, Eqs. (104-1) and (104-2) are shown to be common in that the amplitude in the right-hand first term is A, that the amplitude in the right-hand second term is n (t) and that the error phase $\epsilon_a$ on the right-hand side is the same.

The first and second low-pass filter means 3'-1 and 3'-2 generate third and fourth synchronous phase detecting signals SD'-3 and SD'-4 composed of low-frequency components of the first and second synchronous phase detecting signals SD'-1 and SD'-2, respectively.

Letting noises that are generated in the first and second low-pass filter means 3'-1 and 3'-2 at time t are represented by $n_a$ and $n_a$, respectively, for the sake of brevity, the third and fourth synchronous phase detecting signals SD'-3 and SD'-4 are expressed, in general, by the following equations.

$$SD'\text{-}3 = A \cos(\Delta\omega t - \epsilon_a + \theta(t)) + n_a(t) \tag{106-1}$$

$$SD'\text{-}4 = A \sin(\Delta\omega t - \epsilon_a + \theta(t)) + n_a'(t) \tag{106-2}$$

In the interest of simplicity, Eqs. (106-1) and (106-2) are shown to be common in that the amplitude on the right-hand first term is A.

The first and second sampling means 4'-1 and 4'-2 generate fifth and sixth synchronous phase detecting signals SD'-5 and SD'-6 by sampling the third and fourth synchronous phase detecting signals SD'-3 and SD'-4 with a sampling signal SM' which is generated by the sampling signal generating means 21'.

The sampling signal SM' is expressed by Eq. (113) described later

The synchronous phase detecting signals SD'-5 and SD'-6 are expressed, in general, by the following equations:

$$SD'\text{-}5 = A \cos(\Delta\omega h - \epsilon_a(h) + \theta(h)) + n_a(h) \tag{107-1}$$

$$SD'\text{-}6 = A \sin(\Delta\omega h - \epsilon_a(h) + \theta(h)) + n_a'(h) \tag{107-2}$$

Letting the standard sampling period of the sampling signal SM' be represented by ΔT, letting integers 1,2, ... in a value obtained with t/ΔT be represented by k, and letting i be represented by 0, 1, 2, ... k, letting error phase at i·ΔT be represented by $\epsilon_c$ (i), for the sake of brevity, h is expressed, in general, by following equation.

$$h = i \cdot \Delta T + \epsilon_c(i) \tag{108}$$

Incidentally, for the sake of brevity, Eqs. (107-1) and (107-2) are shown to be common in that the amplitude on the right hand first term is A.

The decoded digital code generating means 11' generates, from the fifth and sixth synchronous phase detecting signals SD'-5 and SD'-6, a decoded digital code SC' which represents the digital code of the four-phase PSK signal SO.

The decoded digital code SC' represents such codes (two-bit in this example) as shown in the column SC' in the following table 1 which depend, in combination, on whether the fifth synchronous phase detecting signal SD'-5 takes a value equal to or greater than 0 (SD'-5≧0) or smaller than 0 (SD'-5<0) and whether the sixth synchronous phase detecting signal SD'-6 takes a value equal to or greater than 0 (SD'-6≧0) or smaller than 0 (SD'-6<0).

TABLE 1

| SD'-5 | SD'-6 | SC |
|---|---|---|
| <0 | <0 | 00 |
| <0 | ≥0 | 01 |
| ≥0 | <0 | 10 |
| ≥0 | ≥0 | 11 |

The sampling signal generating means 21' derives, as the above-mentioned sampling signal SM', a timing signal synchronized with the timing of a code (a symbol) representing communication information of the four-phase PSK signal SO, from either one or both (in FIG. 7, both) of the third and fourth synchronous phase detecting signals SD'-3 and SD'-4.

The sampling signal SM' is generally expressed by the following equation:

$$SM' = S \sum_{i=0}^{k} \delta[t - i \cdot \Delta T - \epsilon_c(i)] \quad (113)$$

where $\delta[t-i\cdot\Delta T\epsilon_c(i)]$ takes a value "1" only when $[t-i\cdot\Delta T-\epsilon_c(i)]=0$ and a value "0" in the other cases.

The signal generating means 41 has the function of a voltage control oscillator controlled by an oscillation control signal SG from the low-pass filter means 42 and which generates a signal of the controlled oscillation frequency as a signal SK-1 which is used to generate a first phase detecting reference signal.

The signal SK-1 is generally expressed by the following equation:

$$SK\text{-}1 = A_e \sin 4(\omega + \Delta\omega)t \quad (115)$$

where $A_e$ is amplitude.

The signal generating means 43 derives, from the four-phase PSK signal SO, a signal of an angular frequency $4\omega$ four times higher than the angular frequency $\omega$ of its carrier as a signal SK-2 which is used to generate a second phase detecting reference signal.

Letting its amplitude be represented by $A_d$ and assuming that its initial phase is 0, the signal SK-2 is generally given by the following equation:

$$SK\text{-}2 = A_d \cos 4\omega t \quad (116)$$

The signal generating means 44 generates a signal phase-detected by the signals SK-1 and SK-2 as a signal SB for oscillation control signal generation use.

The signal generating means 44 has the function of a multiplier which is supplied with the signal SK-1 for first phase detecting reference signal generation use and the signal SK-2 for second phase detecting reference signal generation use.

The signal SB is generally given by the following equation:

$$SB = A_f \sin 4\Delta\omega \quad (117)$$

where $A_f$ is its amplitude.

The low-pass filter means 42 generates the afore-mentioned oscillation control signal SG composed of the low-frequency component of the signal SB from the signal generating means 44.

The phase detecting reference signal generating means 51' derives from the signal SK-1 a reference signal SR'-0 of an angular frequency $(\omega+\Delta\omega)$ which is a quarter of its angular frequency $4(\omega+\Delta\omega)$.

The reference signal SR'-0 is generally given by the following equation:

$$SR'\text{-}0 = A_h \sin(\omega+\Delta\omega)t \quad (102)$$

where $A_h$ is its amplitude.

The phase detecting reference signal generating means 46' generates a signal of the same angular frequency $(\omega+\Delta\omega)$ as that of the reference signal SR'-0 and a signal displaced therefrom $\pi/2$ apart in phase, as the second and first phase detecting reference signals SR'-1 and SR'-2, respectively.

The phase detecting reference signal generating means 46' has a function of outputting the reference signal SR'-0 intact as the second phase detecting reference signal SR'-2 and a function of shifting the phase of the reference signal SR'-0 by $\pi/2$ and outputting the thus phase-shifted signal as the first phase detecting reference signal SR'-1.

The first and second phase detecting reference signals SR'-1 and SR'-2 are generally given by the following equations:

$$SR'\text{-}1 = A_h \cos(\omega+\Delta\omega)t \quad (103\text{-}1)$$

$$SR'\text{-}2 = A_h \sin(\omega+\Delta\omega)t \quad (103\text{-}2)$$

With the conventional four-phase PSK signal decoder described above, the signal generating means 41, which generates the signal SK-1 for producing the first and second phase detecting reference signals SR'-1 and SR'-2 which are applied to the first and second synchronous phase detecting means 2'-1 and 2'-2, respectively, is controlled by the oscillation control signal SG which is derived by the low-pass filter means 42 from the signal SB available from the signal generating means 44. Hence, what is called a PLL (Phase Locked Loop) configuration is formed; in the steady state of the four-phase PSK signal SO, the decoded digital code SC' by the decoded digital code generating means 11' can stably be obtained without a code error.

With the prior art four-phase PSK signal decoder of FIG. 7, it is possible to lessen the influence of noise (expressed by n(t) on the right hand second term of Eq. (101)) contained in the four-phase PSK signal SO with a decrease in the bandwidth of the low-pass filter means 42 which generates the oscillation control signal SG for controlling the signal generating means 41'. In this instance, however, much time is needed for initial carrier synchronization. Furthermore, when the angular frequency $\omega$ of the carrier of the four-phase PSK signal SO fluctuates by the Doppler effect as in the case of an orbiting satellite, the angular frequencies $(\omega+\Delta\omega)$ of the phase detecting reference signals SR'-1 and SR'-2 cannot precisely follow the fluctuating angular frequency $\omega$, sometimes leading to a failure in providing the decoded digital code SC'.

The larger the bandwidth of the low-pass filter means 42 is, the more the above-mentioned follow-up property increases. In this instance, however, a code error is induced in the decoded digital code SC' by the influence of noise (n(t)) contained in the four-phase PSK signal SO.

SUMMARY OF THE INVENTION

It is therefore an object of the present invention to provide a novel multi-phase PSK signal decoder which is free from the above-described defects of the prior art.

A multi-phase PSK signal decoder according to a first aspect of the present invention comprises:

(A) reference signal generating means for generating a reference signal of a frequency or angular frequency corresponding to that of a carrier of a multi-phase PSK signal according to a multi-phase PSK system;

(B) phase detecting reference signal generating means for generating, from said reference signal, first and second phase detecting reference signals which have the same frequency or angular frequency as that of said reference signal and are displaced $\pi/2$ apart in phase;

(C) first and second quasi-synchronous phase detecting means for generating, from said multi-phase PSK signal, first and second quasi-synchronous phase detecting signals quasi-synchronously detected by said first and second phase detecting reference signals of the same phase as that of said multi-phase PSK signal;

(D) first and second digital converting means for generating, from said first and second quasi-synchronous phase detecting signals, first and second digitized quasi-synchronous phase detecting signals by use of a sampling signal;

(E) phase correcting means for generating, from said first and second digitized quasi-synchronous phase detecting signals, third and fourth digitized quasi-synchronous phase shifting signals corrected by phase correcting data of the same phase as those of said first and second digitized quasi-synchronous phase detecting signals;

(F) first and second low-pass filter means for generating, from said third and fourth quasi-synchronous phase detecting signals, fifth and sixth digitized quasi-synchronous phase detecting signals composed of their low-frequency components;

(G) first phase display data generating means for generating, from said fifth and sixth digitized quasi-synchronous phase detecting signals, first phase display data representing the phase of the carrier of said multi-phase PSK signal;

(H) second phase display data generating means for generating, from said first phase display data, second phase display data representing the phase assigned to a code of said multi-phase PSK signal;

(I) decoded digital code generating means for generating, from said second phase display data, a decoded digital code representing the code of said multi-phase PSK signal;

(J) sampling signal generating means for generating, as said sampling signal, a signal of timing synchronized with that of the code of said multi-phase PSK signal, from said first phase display data or either one or both of said fifth and sixth digitized quasi-synchronous phase detecting signals;

(K) phase difference display data generating means for generating phase difference data representing a difference between said first and second phase display data;

(L) signal presence display information generating means for generating, from either one or both of said first and second digitized quasi-synchronous phase detecting signals, signal presence display information representing whether the amplitude of said multi-phase PSK signal to be input into said first and second quasi-synchronous phase detecting means is smaller or larger than a predetermined threshold value; and (M) phase correcting data generating means: (i) which, when said signal presence display information is in its state representing that the amplitude of said multi-phase PSK signal is larger than the predetermined threshold value, estimates the frequency or angular frequency and phase of the carrier of said multi-phase PSK signal from said phase difference display data, then predicts the frequency or angular frequency and phase of the carrier of said multi-phase PSK signal from said estimated frequency or angular frequency and phase thereof and generates, as said phase correcting data, data which represents the phase contained in data representing said predicted frequency or angular frequency and phase; and (ii) which, when said signal presence display information changes from its state representing that the amplitude of said multi-phase PSK signal is larger than the threshold value to its state representing that the amplitude of said multi-phase PSK signal is smaller than the predetermined threshold value, predicts the frequency or angular frequency and phase of the carrier of said multi-phase PSK signal from those estimated until then and generates, as said phase correcting data, data which represents the phase contained in data representing said predicted frequency or angular frequency and phase.

A multi-phase PSK signal decoder according to a second aspect of the present invention comprises, in combination with the means (A) through (K) in the multi-phase PSK signal decoder according to the first aspect of the invention;

(L) signal presence display information generating means which (i) generates, from a signal presence display information generating signal by phase correcting data/signal presence display information generating signal generating means, a smoothed signal presence display information generating signal having its absolute value smoothed and (ii) generates, from said smoothed signal presence display information generating signal, signal presence display information which represents whether the amplitude of said multi-phase PSK signal to be input into said first and second quasi-synchronous phase detecting means is smaller or larger than a predetermined threshold value; and (M) phase correcting data/signal presence display information generating signal generating means: (i) which, when said signal presence display information is in the state representing that the amplitude of said multi-phase PSK signal to be input into said first and second quasi-synchronous phase detecting means is larger than said predetermined threshold value, estimates the frequency or angular frequency and phase of the carrier of said multi-phase PSK signal from said phase difference display data, then predicts the frequency or angular frequency and phase of the carrier of said multi-phase PSK signal from said estimated frequency or angular frequency and phase thereof and generates, as said phase correcting data, data which represents the phase contained in data representing said predicted frequency or angular frequency and phase; (ii) which, when said signal presence display information changes its state representing that the amplitude of said multi-phase PSK signal is larger than said predetermined threshold value to its state representing that the amplitude of said multi-phase PSK signal is smaller than said predetermined threshold value, predicts the frequency or angular frequency and phase of the carrier of said multi-phase PSK signal from those estimated until then and generates, as said phase correcting data, data which represents the phase contained in data representing said predicted frequency or angular frequency and phase; and (ii) which calculates a difference between said phase difference display data and that of said phase correcting data provided at time immediately preceding the current time and generates said difference as said signal presence display information generating signal.

According to a third aspect of the present invention, in the multi-phase PSK signal decoder according to the first or second aspect of the invention, said sampling signal generating means comprises:

(i) clock pulse generating means which generates clock pulses of a period which is 1/k (where k is a relatively large integer) of the reference period of the symbol representing communication information of said multi-phase PSK signal;

(ii) sampling reference period display data generating means which generates sampling reference period display data which represents a period 1/m (where m is an integer smaller than said k) of the reference period of said symbol of said multi-phase PSK signal, as the sampling reference period, by the number of clock pulse from said clock pulse generating means;

(iii) time difference display data generating means which, upon each transition of the amplitude of said seventh digitized quasi-synchronous phase detecting signal between a value ("1" in binary representation) larger than a predetermined threshold value at time $t_a$ corresponding to a point in time when one wave $W_a$ of said sampling signal is obtained and a value ("0" in binary representation) at time $t_b$ corresponding to a point in time when the next wave $W_b$ of said sampling signal is obtained, generates time difference display data which represents, by the number of clock pulses available from said clock pulse generating means, a time difference between a predetermined reference time interval from time corresponding to that one of symbols of the four-phase PSK signal which is closest to an actual amplitude changing time when said seventh digitized quasi-synchronous phase detecting signal takes a value intermediate between values at times $t_a$ and $t_b$ to a predetermined reference amplitude changing time corresponding to said actual amplitude changing time viewed from said time of said one symbol and the real time interval from said time of said one symbol to said actual amplitude changing time;

(iv) sampling synchronization error timing display data generating means formed by low-pass filter means which generates, from said time difference display data, sampling synchronization error timing display data which represents, by the number of clock pulses from said clock pulse generating means, a smoothed version of said time difference as sampling synchronization error timing;

(v) correcting sampling synchronization display data generating means which generates correcting sampling period display data which represents, by the number of clock pulses, the sum of said sampling reference period and said sampling synchronization error timing as a correcting sampling period;

(vi) count means which counts said clock pulses from said clock pulse generating means and, upon each coincidence of the count value with said number of clock pulses represented by said correcting sampling period represented, in turn, by said correcting sampling period display data, outputs one wave as one wave of said sampling signal.

A multi-phase PSK signal decoder according to a fourth aspect of the present invention comprises, in combination with means (A) through (D) in the multi-phase PSK signal decoder according to the first aspect of the invention;

(E) first phase display data generating means for generating first phase display data representing the phase of the carrier of said multi-phase PSK signal from said first and second digitized quasi-synchronous phase detecting signals;

(F) phase correcting means for generating second phase display data composed of a signal corrected by said phase correcting data, from said first phase display data;

(G) second phase display data generating means for generating third phase display data representing the phase assigned to the code of said multi-phase PSK signal, from said second phase display data;

(H) decoded digital code generating means for generating decoded digital code representing the digital code of said multi-phase PSK signal, from said third phase display data;

(I) sampling signal generating means for generating, as a sampling signal, a signal of timing synchronized with the code of said multi-phase PSK signal, from said second phase display data;

(J) phase difference display data generating means for generating phase difference display data which representing a difference between said first and third phase display data;

(K) signal presence display information generating means for generating, from either one or both of said first and second digitized quasi-synchronous phase detecting signals, signal presence display information composed of a signal representing whether the amplitude of said multi-phase PSK signal to be input into said first and second quasi-synchronous phase detecting means is smaller or larger than a predetermined threshold value; and (L) phase correcting data generating means: (i) which, when said signal presence display information is in its state representing that the amplitude of said multi-phase PSK signal is larger than the predetermined threshold value, estimates the frequency or angular frequency and phase of the carrier of said multi-phase PSK signal from said phase difference display data, then predicts the frequency or angular frequency and phase of the carrier of said multi-phase PSK signal from said estimated frequency or angular frequency and phase thereof and generates, as said phase correcting data, data which represents the phase contained in data representing said predicted frequency or angular frequency and phase; and (ii) which, when said signal presence display information changes from its state representing that the amplitude of said multi-phase PSK signal is larger than the threshold value to its state representing that the amplitude of said multi-phase PSK signal is smaller than the predetermined threshold value, predicts the frequency or angular frequency and phase of the carrier of said multi-phase PSK signal from those estimated until then and generates, as said phase correcting data, data which represents the phase contained in data representing said predicted frequency or angular frequency and phase.

A multi-phase PSK signal decoder according to a fifth aspect of the present invention comprises, in combination with means (A) through (J) in the multi-phase PSK signal decoder according to the fourth aspect of the invention;

(K) signal presence display information generating means which (i) generates, from a signal presence display information generating signal by phase correcting data/signal presence display information generating signal generating means, a smoothed signal presence display information generating signal having its absolute value smoothed and (ii) generates, from said smoothed signal presence display information generating signal, signal presence display information which represents whether the amplitude of said multi-phase PSK signal to be input into said first and second quasi-synchronous phase detecting means is smaller or larger than a predetermined threshold value; and (L) phase correcting data/signal presence display information generating signal generating means: (i) which, when said signal presence display information is in the state representing that the amplitude of said multi-phase PSK signal to be input into said first and second quasi-synchronous phase detecting means is larger than said predetermined threshold value, estimates the frequency or angular frequency and phase of the carrier of said multi-phase PSK signal from said phase difference display data, then predicts the frequency or angular frequency and phase of the carrier of said multi-phase PSK signal from said estimated frequency or angular frequency and phase thereof and generates, as said phase correcting data, data which represents the phase contained in data representing said predicted frequency or angular frequency and phase; (ii) which, when said signal presence display information changes its state representing that the amplitude of said multi-phase PSK signal is larger than said predetermined threshold value to its state representing that the amplitude of said multi-phase PSK signal is smaller than said predetermined threshold value, predicts the frequency or angular frequency and phase of the carrier of said multi-phase PSK signal from those estimated until then and generates, as said phase correcting data, data which represents the phase contained in data representing said predicted frequency or angular frequency and phase; and (iii) which calculates a difference between said phase difference display data and that of said phase correcting data provided at time immediately preceding the current time and generates said difference as said signal presence display information generating signal.

According to a sixth aspect of the present invention, in the multi-phase PSK signal decoder according to the fourth or fifth aspect of the invention, said sampling signal generating means comprises:

(i) clock pulse generating means which generates clock pulses of a period which is 1/k (where k is a relatively large integer) of the reference period of the symbol representing communication information of said multi-phase PSK signal;

(ii) sampling reference period display data generating means which generates sampling reference period display data which represents a period 1/m (where m is an integer smaller than said k) of the reference period of said symbol of said multi-phase PSK signal, as the sampling reference period, by the number of clock pulses from said clock pulse generating means;

(iii) time difference display data generating means which, upon each transition of the phase of said second phase display data between a value ("1" in binary representation) larger than a predetermined threshold value at time $t_a$ corresponding to a point in time when one wave $W_a$ of said sampling signal is obtained and a value ("1" in binary representation) at time $t_b$ corresponding to a point in time when the next wave $W_b$ of said sampling signal is obtained, generates time difference display data which represents, by the number of clock pulses available from said clock pulse generating means, a time difference between a predetermined reference time interval from time corresponding to that one of symbols of the four-phase PSK signal which is closest to an actual phase changing time when said second phase display data takes a value intermediate between values at times $t_a$ and $t_b$ to a predetermined reference phase changing time corresponding to said actual phase changing time viewed from said time of said one symbol and the real time interval from said time of said one symbol to said actual phase changing time;

(iv) sampling synchronization error timing display data generating means formed by low-pass filter means which generates, from said time difference display data, sampling synchronization error timing display data which represents, by the number of clock pulses from said clock pulse generating means, a smoothed version of said time difference as sampling synchronization error timing;

(v) correcting sampling synchronization display data generating means which generates correcting sampling period display data which represents, by the number of clock pulses, the sum of said sampling reference period and said sampling synchronization error timing as a correcting sampling period; and (vi) count means which counts said clock pulses from said clock pulse generating means and, upon each coincidence of the count value with said number of clock pulses represented by said correcting sampling period represented, in turn, by said correcting sampling period display data, outputs one wave as one wave of said sampling signal.

BRIEF DESCRIPTION OF THE DRAWINGS

FIG. 6 is a block diagram showing an example of sampling signal generating means for use in the embodiments of FIGS. 4 and 5; and FIG. 7 is a block diagram showing a conventional four-phase PSK signal decoder.

DESCRIPTION OF THE PREFERRED EMBODIMENTS

Embodiment 1

Figure 1:
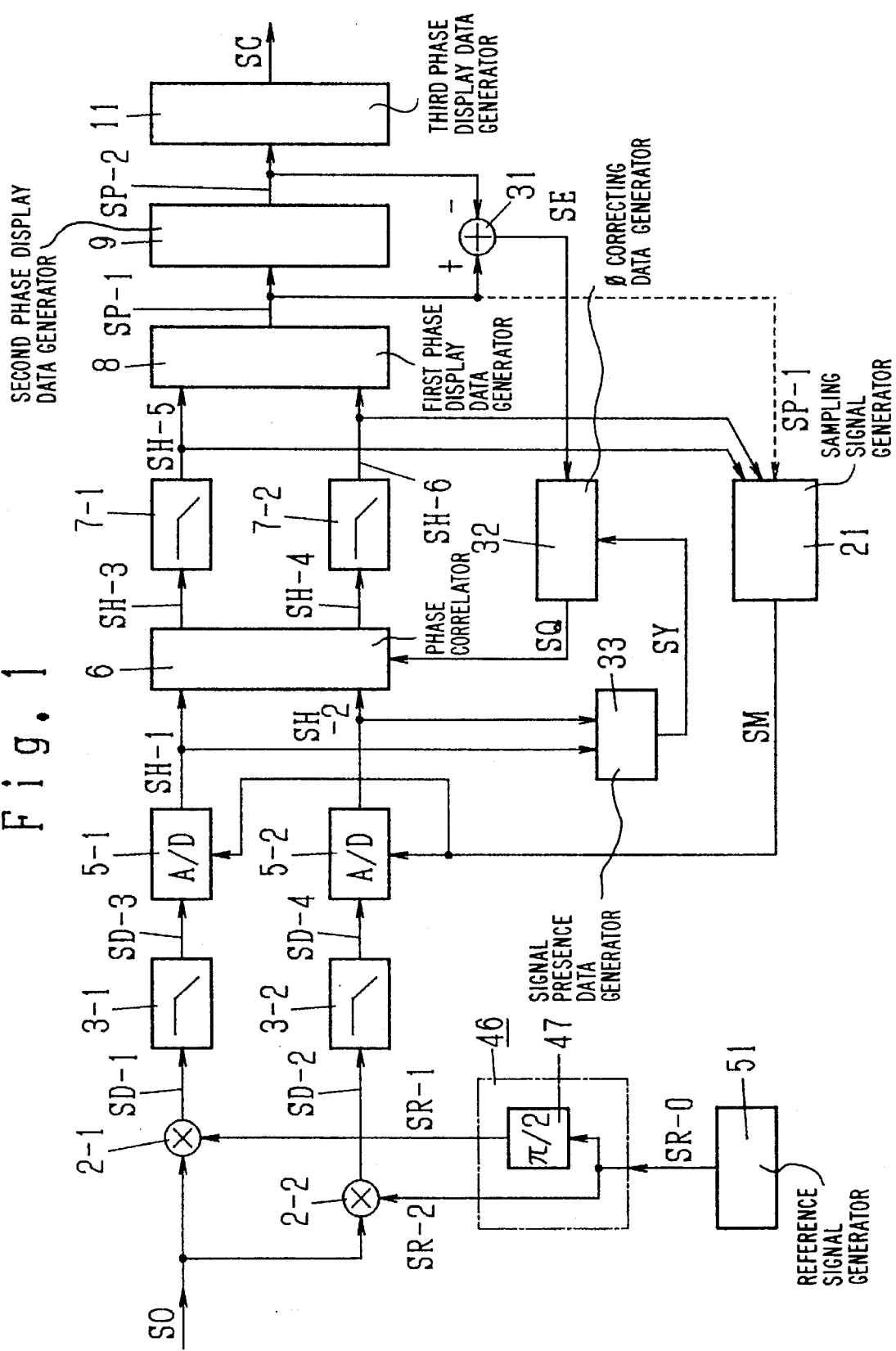
FIG. 1 is a block diagram illustrating a first embodiment of the present invention.

A description will be given, with reference to FIG. 1, of a first embodiment of the four-phase PSK signal decoder according to the present invention.

The four-phase PSK signal decoder of this embodiment comprises: reference signal generating means 51; phase detecting reference signal generating means 46; first and second quasi-synchronous phase detecting means 2-1 and 2-1; first and second low-pass filter means 3-1 and 3-2; first and second digital converting means 5-1 and 5-2; phase correcting means 6; third and fourth low-pass filter means 7-1 and 7-2; first phase display data generating means 8; second phase display data generating means 9; decoded digital code generating means 11; sampling signal generating means 21; phase difference display data generating means 31; signal presence information generating means 33; and phase correcting data generating means 32.

The reference signal generating means 51 generates a reference signal SR-0 of an angular frequency $\omega_0$ corresponding to the angular frequency $\omega$ of the four-phase PSK signal SO. The reference signal generating means 51 has the function of an oscillator.

The four-phase PSK signal SO is the same as mentioned previously in respect of the prior art example of FIG. 7 Assuming, for simplicity's sake, that the initial phase of its carrier is zero, the four-phase PSK signal SO is expressed by the following equation:

$$SO = 2A \cos(\omega t + \theta(t)) + n(t) \quad (1)$$

where A is the amplitude of the signal SO, $\omega$ the angular frequency of its carrier, t time, $\theta(t)$ the phase of the code (a symbol) representing communication information (a code (a symbol) at time t and n(t) noise at time t, as in the case of the FIG. 7 prior art example.

Assuming, for brevity's sake, that its amplitude is 1, the reference signal SR-O is generally given by the following equation:

$$SR\text{-}0 = \sin(\omega_o t + \theta_o) \quad (2)$$

The phase detecting reference signal generating means 46 derives from the reference signal SR-0 a second phase detecting reference signal SR-2 which has the same angular frequency $\omega_0$ as that of the signal SR-0 and a first phase detecting reference signal SR-1 which is $\pi/2$ out of phase with the second phase detecting reference signal SR-2.

The phase detecting reference signal generating means 46 may be the same as that 46 used in the prior art example of FIG. 7. That is, the phase detecting reference signal generating means 46 has a function of outputting the reference signal SR-0 intact as the second phase detecting reference signal SR-2 and the function of a phase shifting means 47 which phase shifts the references signal SR-0 by $\pi/2$ and provides the phase-shifted signal as the first phase detecting reference signal SR-1.

Assuming, for the sake of brevity, that the first and second phase detecting reference signals SR-1 and SR-2 both have an amplitude 1 and have no phase deviation from the reference signal SR-0, they are generally given by the following equations:

$$SR\text{-}1 = \cos(\omega_o t + \theta_o) \quad (3\text{-}1)$$

$$SR\text{-}2 = \sin(\omega_o t + \theta_o) \quad (3\text{-}2)$$

The first and second quasi-synchronous phase detecting means 2-1 and 2-2 derive, from the four-phase PSK signal SO, first and second quasi-synchronous phased detecting signals SD-1 and SD-2 quasi-synchronously detected by the first and second phase detecting reference signals SR-1 and SR-2 of the phase $(\omega t + \theta(t))$.

The first and second quasi-synchronous phase detecting means 2-1 and 2-2 have the same functions as those of the synchronous phase detecting means 2'-1 and 2'-2 of the FIG. 7 prior art example. That is, the quasi-synchronous phase detecting means 2-1 has the function of a multiplier which is supplied with the four-phase PSK signal SO and the first phase detecting reference signal SR-1. Similarly, the second quasi-synchronous phase detecting means 2-2 has the function of a multiplier which is supplied with the four-phase PSK signal SO and the second phase detecting reference signal SR-2.

The first and second quasi-synchronous phase detecting signals SD-1 and SD-2 correspond to those SD'-1 and SD'-2 given by Eqs. (104-1) and (104-2) referred to previously with respect to the prior art example of FIG. 7. That is, they are generally given by the following equations, using Eqs. (1) which expresses the four-phase PSK signal SO and (3-1) and (3-2) which express the first and second phase detecting reference signals SR-1 and SR-2, respectively.

$$SD\text{-}1 = A\{\cos(\Delta\omega t + \Delta\theta(t)) - \cos((\omega+\omega_o)t+\theta(t)+\theta_o)\} n(t) \cos(\omega_o t + \theta_o) \quad (4\text{-}1)$$

$$SD\text{-}2 = A\{\sin(\Delta\omega t + \Delta\theta(t)) - \sin((\omega+\omega_o)t+\theta(t)+\theta_o)\} + n(t) \sin(\omega_o t + \theta_o) \quad (4\text{-}2)$$

In Eqs. (4-1) and (4-2), $\Delta\omega$ is expressed as the difference $(\omega - \omega_o)$ between the angular frequency $\omega$ of the carrier of the four-phase PSK signal SO and the angular frequencies $\omega_0$ of the first and second phase detecting reference signals SR-1 and SR-2, as given by $$\Delta\omega = \omega - \omega_o \quad (5\text{-}A)$$

Further, $\Delta\theta(t)$ is expressed as the difference $(\theta(t) - \theta_0)$ between the phase $\theta(t)$ of the code (the symbol) representing the communication information of the carrier of the four-phase PSK signal SO at time t and the initial phases $\theta_0$ of the first and second phase detecting reference signals SR-1 and SR-2, as given by $$\Delta\theta(t) = \theta(t) - \theta_o \quad (5\text{-}B)$$

Incidentally, for brevity's sake, in Eqs. (4-1) and (4-2), the amplitudes A on the right-hand first terms are shown to be the same and the amplitudes on the right-hand second terms are shown to be noise n(t) of the four-phase PSK signal SO in Eq. (1).

The first and second low-pass filter means 3-1 and 3-2 generate third and fourth quasi-synchronous phase detecting signals SD-3 and SD-4 composed of low-frequency components of the first and second quasi-synchronous phase detecting signals SD-1 and SD-2, respectively. The first and second low-pass filter means 3-1 and 3-2 correspond to those 3'-1 and 3'-2 used in the prior art example of FIG. 7.

Letting noise that is generated in the first and second low-pass filters 3-1 and 3-2 at time t are represented by $n_a(t)$ and $n_a'(t)$, the third and fourth quasi-synchronous phase detecting signals SD-3 and SD-4 are given by the following equations:

$$SD\text{-}3 = A \cos(\Delta\omega t + \Delta\theta(t)) + n_a(t) \quad (6\text{-}1)$$

$$SD\text{-}4 = A \sin(\Delta\omega t + \Delta\theta(t)) + n_a'(t) \quad (6\text{-}2)$$

In the interest of simplicity, the amplitudes A on the right-hand first terms in Eqs. (6-1) and (6-2) are shown to be the same.

The first and second digital converting means 5-1 and 5-2 are supplied with the third and fourth quasi-synchronous phase detecting signals SD-3 and SD-4 from the first and second low-pass filter means 3-1 and 3-2 respectively and a sampling signal SM from the sampling signal generating means 21 and generate first and second digitized quasi-synchronous phase detecting signals SH-1 and SH-2 converted from the third and fourth quasi-synchronous phase detecting signals SD-3 and SD-4 to digital form.

Letting the sampling period of the sampling signal SM (which is 1/m of the reference period $T_S$ of the symbol representing the communication information of the four-phase PSK signal SO, m being an integer of a relatively small value such as 4) be represented by $\Delta T$ and letting integers 1, 2, ... in the value $t/\Delta T$ be represented generically by k, the first and second digitized quasi-synchronous phase detecting signals SH-1 and SH-2 are expressed by the following equations:

$$SH\text{-}1 = A \cos(\Delta\omega \cdot k \cdot \Delta T + \Delta\theta(k)) + n_a(k) \quad (7\text{-}1)$$

$$SH\text{-}2 = A \sin(\Delta\omega \cdot k \cdot \Delta T + \Delta\theta(k)) + n_a'(k) \quad (7\text{-}2)$$

In Eqs. (7-1) and (7-2), $\Delta\theta(k)$ is the phase $\Delta\theta(t)$ in Eqs. (5-B), (6-1) and (6-2) when time t is $k\cdot\Delta T$, and it is given by $$\Delta\theta(k)=\theta(k)-\theta_o \qquad (8)$$

Further, $n_a(k)$ and $n_a'(k)$ are noise $n_a(t)$ and noise $n_a'(t)$ in Eqs. (6-1) and (6-2) when time t is $k\cdot\Delta T$. For the sake of brevity, in Eqs. (7-1) and (7-2), the amplitude A on the right-hand first term is shown to be the same as in Eqs. (6-1) and (6-2).

The phase correcting means 6 is supplied with the digitized quasi-synchronous phase detecting signals SH-1 and SH-2 from the first and second digital converting means 5-1 and 5-2 and phase correcting data SQ from the phase correcting data generating means 32 and derives, from the first and second digitized quasi-synchronous phase detecting signals SH-1 and SH-2, third and fourth digitized quasi-synchronous phase detecting signals SH-3 and SH-4 corrected by phase correcting data SQ of their phases ($\Delta\omega\cdot k\cdot\Delta t+\Delta\theta(k)$) expressed by Eqs. (7-1) and (7-2), respectively.

Here, the first and second digitized quasi-phase detecting signals SH-1 and SH-2 of Eqs. (7-1) and (7-2) are expressed using Eq. (8-B) by $$SH\text{-}1 = A\cos(\Delta\omega\cdot k\cdot\Delta T+\Delta\theta(k)-\theta_0)+n_a(k) \qquad (7'\text{-}1)$$

$$SH\text{-}2 = A\sin(\Delta\omega\cdot k\cdot\Delta T+\Delta\theta(k)-\theta_0)+n_a'(k) \qquad (7'\text{-}2)$$

and the phase ($\Delta\omega\cdot k\cdot\Delta T-\theta_0$) in the right-hand first term of each of Eqs. (7'-1) and (7'-2) is corrected by $$(\widetilde{\theta}(k)+\widetilde{\omega}(k)\cdot\Delta T)$$

on the right-hand hand of Eq. (15) which represents phase correcting data SQ available from the phase correcting data generating means 32 described later later on. In consequence, the third and fourth quasi-synchronous phase detecting signals SH-3 and SH-4 are generally expressed by the following equations.

$$SH\text{-}3 = A\cos(\theta(k))+n_a(k). \qquad (10\text{-}1)$$

$$SH\text{-}4 = A\sin(\theta(k))+n_a'(k) \qquad (10\text{-}2)$$

For the sake of brevity, Eqs. (10-1) and (10-2) show the case where the phase ($\Delta\omega\cdot k\cdot\Delta T-\theta_0$) on the right-hand first term in each of Eqs. (7'-1) and (7'-2) is ideally corrected by $$(\theta(k)+\omega(k)\cdot\Delta T)$$

on the right-hand side of Eq. (15) so that the difference between them (identified as $\theta_d(k)$ $$(=(\Delta\omega\cdot k\cdot\Delta T-\theta_0)-(\widetilde{\theta}(k)+\widetilde{\omega}(k)\cdot\Delta T)$$

is reduced to zero, that is, $\theta_d(k)=0$. Incidentally, when the phase is not ideally corrected so that the difference $\theta_d(k)$ is reduced to zero, Eqs. (10-1) and (10-2) becomes as follows:

$$SH\text{-}3 = A\cos(\theta(k)+\theta_d(k))+n_a(k). \qquad (10'\text{-}1)$$

$$SH\text{-}4 = A\sin(\theta(k)+\theta_d(k))+n_a'(k). \qquad (10'\text{-}2)$$

For simplicity's sake, Eqs. (10-1), (10'-1) and (10-2), (10'-2) are shown to have the same amplitude A on their right-hand first terms as that in Eqs. (9-1) and (7-2) and the same noise $n_a(k)$ and $n_a'(k)$ on their right-hand second terms as that in Eqs. (7-1) and (7-2) respectively.

The third and fourth digitized quasi-synchronous phase detecting signals SH-3 and SH-4 by the phase correcting means 6 are provided therefrom as substantially the same signals as the output signals from the first and second digital converting means 5-1 and 5-2 when the angular frequency $\omega_0$ of the reference signal SR-0 available from the reference signal generating means 51 is equal to the angular frequency $\omega$ of the carrier of the four-phase PSK signal SO and consequently when the angular frequencies $\omega_0$ of the first and second phase detecting signals SR-1 and SR-2 available from the phase detecting reference signal generating means 46 are equal to the angular frequency $\omega$ of the four-phase PSK signal SO. Alternatively, the third and fourth digitized quasi-synchronous phase detecting signals SH-3 and SH-4 are provided as the phase correcting signals which are substantially the same as the first and second digitized quasi-synchronous phase detecting signals SH-1 and SH-2 when they are outputted intact from the phase correcting means without being corrected with the phase correcting data SQ. Hence, the third and fourth digitized quasi-synchronous phase detecting signals SH-3 and SH-4 can be called digitized phase synchronous detecting signals.

The third and fourth low-pass filter means 7-1 and 7-2 use the third and fourth digitized quasi-synchronous phase detecting signals SH-3 and SH-4 to generate, fifth and sixth digitized quasi-synchronous phase detecting signals SH-5 and SH-6 composed of their low-frequency components.

In this instance, high-frequency components of the noises $n_a(t)$ and $n_a'(t)$ in the third and fourth digitized quasi-synchronous phase detecting signals SH-3 and SH-4 of Eqs. (10-1) and (10-2) or (10'-1) and (10'-2) are removed. Letting the noises having their high-frequency components removed be represented by $n_b(k)$ and $n_b'(k)$ the fifth and sixth digitized quasi-synchronous phase detecting signals SH-5 and SH-6 are generally expressed by the following equations.

$$SH\text{-}5 = A\cos(\theta(k))+n_b(k). \qquad (11\text{-}1)$$

$$SH\text{-}6 = A\sin(\theta(k))+n_b'(k). \qquad (11\text{-}2)$$

Alternatively, $$SH\text{-}5 = A\cos(\theta(k)+\theta_d(k))+n_b(k) \qquad (11'\text{-}1)$$

$$SH\text{-}6 = A\sin(\theta(k)+\theta_d(k))+n_b'(k) \qquad (11'\text{-}2)$$

For brevity's sake, Eqs. (11-1), (11'-1) and (11-2), (11'-2) are shown to have the same amplitude A on the right-hand first term as in Eqs. (10-1) and (10-2).

The first phase display data generating means 8 derives, from the fifth and sixth digitized quasi-synchronous phase detecting signals SH-5 and SH-6 of Eqs. (11-1) and (11-2) or (11'-1) and (11'-2) or (11'-1) and (11'-2), the phase $\theta(k)$ on the right-hand first term of each of Eqs. (11-1) and (11-2) as first phase display data SP-1 representing the phase of the carrier of the four-phase PSK signal SO.

Letting the phase noises corresponding to the noises $n_b(k)$ and $n_b'(k)$ on the right-hand second term in each of Eqs. (11-1) and (11-2) or (11'-1) and (11'-2) be represented by $\theta_c(k)$, the first phase display data SP-1 is given by the following equation.

$$SP\text{-}1 = \theta(k)+\theta_c(k) \qquad (12)$$

Alternatively, $$SP\text{-}1 = \theta(k)+\theta_d(k)+\theta_c(k). \qquad (12')$$

The first phase display data SP-1 given by Eq. (12) or (12') can be obtained by calculating obtained by calculating $$\tan^{-1}(A\sin(\theta(k)+n_b(k))/(A\cos(\theta(k))+n_b'(k))$$

or $$\tan^{-1}(A \sin (\theta(k) + \theta_d(k)) + n_b(k))/(A \cos (\theta(k) + \theta_d(k)) + n_b'(k))$$

in the first phase display data generating means 8 on the basis of Eqs. (11-1) and (11-2) or (11'-1) and (11'-2) and 8.

The second phase display data generating means 9 derives, from the first phase display data SP-1, second phase display data SP-2 representing the phase assigned to the symbol which represents the communication information of the four-phase PSK signal SO.

The second phase display data SP-2 indicates the respective phase shown in the column (SP-2) in the following table 2 when the first phase display data SP-1 (which indicates the phase expressed by $((\theta(k)+\theta_c(k))$ or $(\theta(k)+\theta_d(k)+\theta_c(k)))$ satisfies the corresponding condition shown in the column "condition."

TABLE 2

| SP-2 | CONDITION |
|---|---|
| π/4 | 0 ≦ SP-1 ≦ π/2 |
| 3π/4 | π/2 < SP-1 ≦ π |
| −π/4 (or 5π/4) | 0 > SP-1 ≧ −π/2 |
| −3π/4 (or 7π/4) | π/2 > SP-1 > −π |

The decoded digital code generating means 11 derives, from the second phase display data SP-2, a decoded digital code SC representing the code or symbol which indicating the communication information of the four-phase PSK signal SO.

The decoded digital code SC represents the code (two-bit in this example) shown in the column SC in the following table 3 when the second phase display data SP-2 (representing the phase shown in the column (SP-2) in Table 2 has the corresponding phase shown in the column (SP-2).

TABLE 3

| SC | SP-2 |
|---|---|
| 00 | π/4 |
| 01 | 3π/4 |
| 10 | −π/4 (or 5π/4) |
| 11 | −3π/4 (or 7π/4) |

The sampling signal generating means 21 derives, as the sampling signal SM, a signal of the timing synchronized with that of the code or symbol indicating the communication information of the four-phase PSK signal SO from the first phase display data SP-1 or either one or both of the fifth and sixth digitized quasi-synchronous phase detecting signals SH-5 and SH-6.

The sampling signal SM is given by the following equation, using a function δ:

$$SM = S \sum_{i=1}^{k} \delta[t - i\Delta T - \epsilon_t(i)] \qquad (13)$$

$$= S \sum_{i=1}^{k-1} \delta[t - i\Delta T - \epsilon_t(i)] +$$

$$S \cdot \delta[t - \Delta T - \epsilon_t(K)]$$

where S is amplitude, i is 0, 1, 2,..., k and $\epsilon_t (i)$ is a timing error. Here, $\delta[t-i \Delta T-\epsilon_t(i)]$ takes a value "1" only when $[t-i\Delta T-\epsilon_t(i)]$ is 0 and "0" when the latter takes other values.

Figure 3:
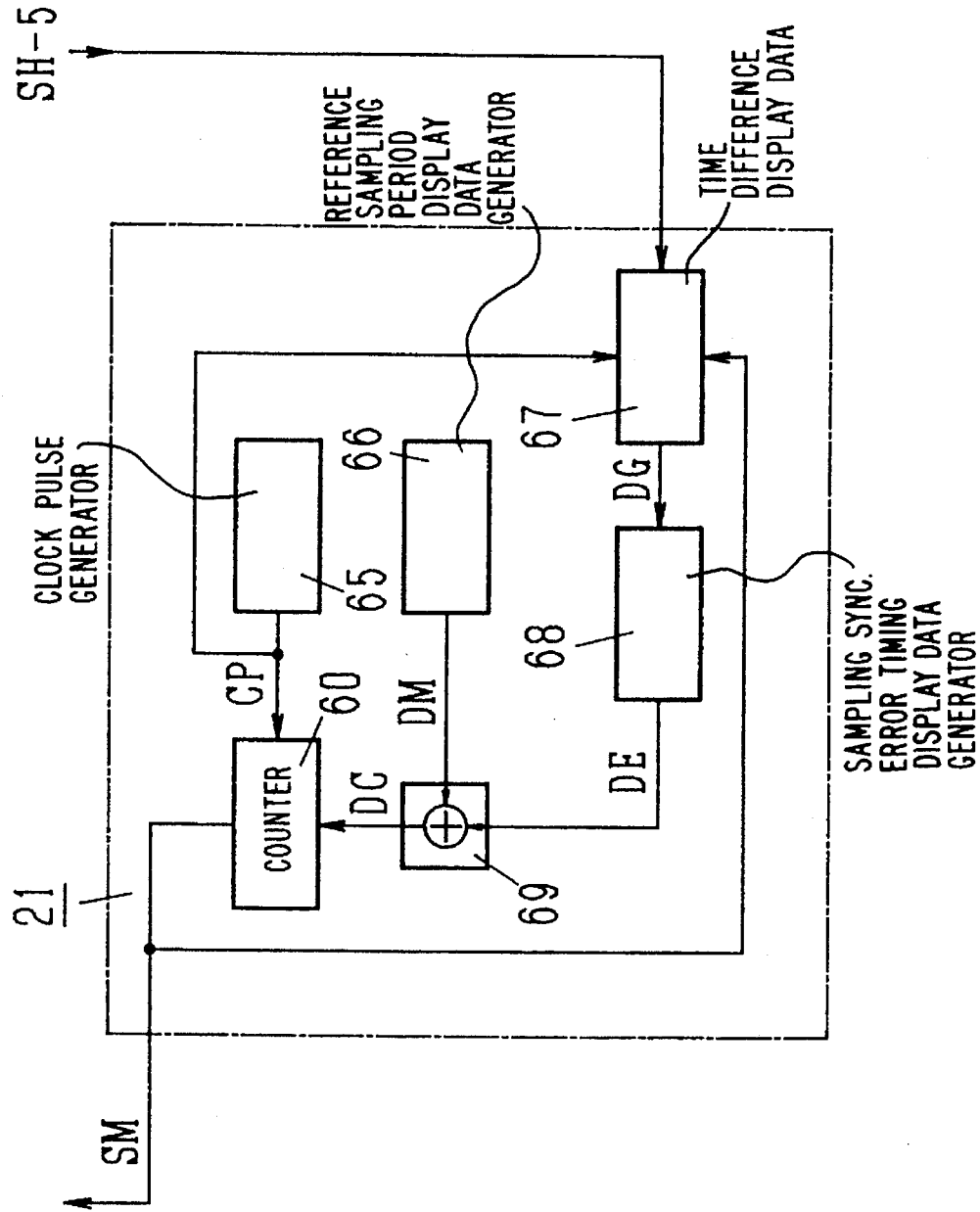
FIG. 3 is a block diagram showing an example of sampling signal generating means for use in the embodiments of FIGS. 1 and 2.

In the case of generating the sampling signal SM of Eq. (13) by using the fifth digitized quasi-synchronous phase detecting signal SH-5 from the low-pass filter means 7-1, the sampling signal generating means 21 may be constructed as shown in FIG. 3.

The sampling signal generating means 21 comprises: clock pulse generating means 65; reference sampling period display data generating means 66; time difference display data generating means 67; sampling synchronization error timing display data generating means 68; correcting sampling period display data generating means 69; and count means 60.

The clock pulse generating means 65 generates clock pulses CP of a period $T_{op}$ $(=T_s/q=(\Delta T \cdot m)/q$, where m is an integer of a relatively small value such as 4 and q an integer of relatively large value such as 100) which is 1/q of the standard period $T_s$ (m times the sampling reference period $\Delta T$ or the sampling signal SM, that is, having a value $\Delta T \cdot m$) of the code or symbol indicating the communication information of the four-phase PSK signal SO.

The reference sampling period display data generating means 66 generates reference sampling period display data DM which represents the reference sampling period $\Delta T(= T_s/m)$ of the sampling signal SM by the number or count value $N_M$ of the clock pulses CP available from the clock pulse generating means 65.

Each time the amplitude of the fifth digitized quasi-synchronous phase detecting signal SH-5 from the low-pass filter means 7-1 switches between a positive or negative value "1" at time $t_a$ corresponding point in time when one wave $W_a$ of the sampling signal SM is obtained and a negative or positive value "0" at time $t_b$ corresponding to a point in time when the next wave $W_b$ of the sampling signal SM is obtained, the time difference display data generating means 67 generates time difference display data DG which represents, by the number $\Delta N_G$ of clock pulses CP available from the clock pulse generating means 65, a time difference $\Delta T_G$ $(=T_{MS}-T_{MC})$, where $T_{MS}$ is a predetermined reference time interval from time $t_M$ of that one of symbols of the four-phase PSK signal SO which is closest to an actual amplitude changing time $t_C$ when the fifth digitized quasi-synchronous phase detecting signal SH-5 takes a value $V_c$ (which is $(V_a+V_b)/2$), for example intermediate between values $V_a$ and $V_b$ at times $t_a$ and $t_b$, to a predetermined reference amplitude changing time $t_S$ corresponding to the actual amplitude changing time $t_C$ viewed from the time $t_M$ and $T_{MC}$ is the real time from the time $t_M$ to the actual amplitude changing time $t_C$. The time difference display data generating means 67 can easily be constructed in various forms.

The sampling synchronization error timing display data generating means 68 is formed by low-pass filter means which derives, from the time difference display data DG, sampling synchronization error timing display data DE which represents, by the number $\Delta N_E$ of clock pulses CP from the clock pulse generating means 65, a smoothed version of the time difference $\Delta T_G$ as sampling synchronization error timing $\Delta T_E$. The sampling synchronization error timing display data generating means 68 can be constructed in various forms. The sampling synchronization error timing display data DE corresponding to $(-\epsilon_t (i))$ in Eq. (13) which expresses the sampling signal SM.

The correcting sampling synchronization display data generating means 69 generates correcting sampling period display data DC which represents, by the number $N_D$ $(=N_M+\Delta N_E)$ of the clock pulses CP, the sum $(\Delta T +\Delta T_E)$ of the sampling reference period $\Delta T$ and the sampling synchronization error timing $\Delta T_E$ as sampling period $T_D$ $(=\Delta T +\Delta T_E)$ for correction use. The data generating means 69 can also be constructed in various forms. The sampling period display data DC for correction use corresponds to $(\Delta T-\epsilon_t(i))$ in Eq. (13) which expresses the sampling signal SM.

The count means 60 counts the clock pulses CP from the clock pulse generating means 65 and, upon each coincidence of the count value with the above-mentioned number $N_D$ (=$N_M$+$\Delta N_E$), outputs one wave (corresponding to $S \cdot \delta[t-\Delta T-s_t(k)]$ in Eq. (13)). The count means 60 can also be constructed in various forms.

The sampling signal generating means of the construction shown in FIG. 3 has no means of a large time constant; hence, even if the four-phase PSK signal SO is obtained after temporary interruption, the sampling signal SM can rapidly be generated correctly in synchronization with the symbol which represents communication information of the PSK signal SO.

With the FIG. 3 construction of the sampling signal generating means 21, it is possible, therefore, for the decoded digital code generating means 11 to rapidly produce the decoded digital code SC with a low error rate, even if the four-phase PSK signal SO is provided after temporary interruption.

The phase difference display data generating means 31 generates phase difference display data SE which represents the difference between the first and second phase display data SP-1 and SP-2.

The phase difference display data SE is expressed by the following equation, using Eq. (12) or (12') which expresses the first phase display data SP-1 and the phase (corresponding to $\theta(k)$ in Eq. (12) or (12')) in the column "SP-2" of Table 2 which expresses the second phrase display data SP-2.

$$SE=(SP\text{-}1)-(SP\text{-}2)=\theta_c(k) \quad (14)$$

Alternatively, $$SE=(SP\text{-}1)-(SP\text{-}2)=\theta_c(k)+\theta_d(k) \quad (14')$$

The signal presence information generating means 33 derives, from either one or both of the first and second digitized quasi-synchronous phase detecting signals SH-1 and SH-2 (both in this example), signal presence display information SY composed of a signal which goes to a "0" or "1" depending upon whether the amplitude of the four-phase PSK signal SO which is input into the first and second quasi-synchronous phase detecting means 2-1 and 2-2 is smaller or larger than a predetermined threshold.

When the first and second digitized quasi-synchronous phase detecting signals SH-1 and SH-2 are both used, the sum $(A^2+(N_a(k))^2+(N_a'(k))^2)$ of signals obtained by squaring the signals SH-1 and SH-2 is compared with a predetermined threshold value.

When the amplitude of the four-phase PSK signal SO changes from a value larger than the threshold value to a value smaller than the threshold value, the signal presence display information SY goes from its high ("1") state to its low ("0") state; this transition of the information SY from its high state to its low state takes place a predetermined relatively long time $T_{1\text{-}0}$, for instance, 40 to 50 times longer than the reference period $\Delta T$ of the sampling signal SM, after the above-mentioned transition of the amplitude of the four-phase PSK signal SO. When the amplitude of the signal SO changes from a value smaller than the threshold value to a value larger than the threshold value, the signal presence display information SY transitions from its low ("0") state to its high ("1") state after an elapsed time $T_{0\text{-}1}$ shorter than $T_{1\text{-}0}$.

The phase correcting data generating leans 32 derives, from the phase difference display data SE and using the signal presence display information SY, phase correcting data SQ when the amplitude of the four-phase PSK signal SO which is input into the first and second quasi-synchronous phase detecting means 2-1 and 2-2 is larger than the predetermined threshold value, that is, when the signal presence display information SY is in the "1" state. The phase correcting data SQ in this instance is data that represents a phase $$\grave{\theta}(k+1)$$

contained in data indicating the angular frequency $$\grave{\omega}(k+1)$$

and the phase $$\grave{\theta}(k+1)$$

of the angular frequency $\omega(k+1)$ and the phase $\theta(k+1)$ of the carrier of the four-phase PSK signal SO which are predicted using estimated versions $$\tilde{\omega}(k)$$

and $$\tilde{\theta}(k)$$

of the angular frequency $\omega(k)$ and the $\theta(k)$ of the carrier of the PSK signal SO. When the signal presence display information SY goes from the "1" state to the "0" state in which the amplitude of the four-phase PSK signal SO which is input into the first and second quasi-synchronous phase detecting means 2-1 and 2-2 is smaller than the predetermined threshold value, the phase correcting data generating means 32 provides, from the phase difference display data SE as the phase correcting data SQ, data that represents the phase $$\grave{\theta}(k+1)$$

contained in data indicating the angular frequency $$\grave{\omega}(k+1)$$

and the phase $$\grave{\theta}(k+1)$$

of the angular frequency $\omega(k+1)$ and the phase $\theta(k+1)$ of the carrier of the four-phase PSK signal SO which are predicted using the above-mentioned estimated angular frequency $$\tilde{\omega}(k)$$

and phase $$\tilde{\theta}(k)$$

The phase correcting data SQ is generally given by the following equation.

$$SQ=\grave{\theta}(k+1)=\theta(k)+\omega(k)=\Delta T \quad (15)$$

For the sake of simplicity, however, Eq. (15) shows the case where the angular frequency $\omega$ of the carrier of the four-phase PSK signal SO does not fluctuate.

The phase correcting data generating means 32 can be implemented by a prediction filter having variable frequency band characteristics, which is supplied with the phase difference display data SE and controlled by the signal presence display information SY for example, a prediction filter based on the Kalman filter theory.

The prediction filter based on the Kalman filter theory is generally expressed by the following equations.

$$\vec{X}_k = \Phi_k \tilde{X}_{k-1} \quad (16)$$

$$\tilde{X}_k = \vec{X}_k + A_k[Y_k^* - M_k \vec{X}_k] \quad (17)$$

$$P_k = \Phi_k J_{k-1} \Phi_k^t + V_k \quad (18)$$

$$A_k = P_k M_k^t [M_k P_k M_k^t + W_k]^{-1} \quad (19)$$

$$J_k = [I - A_k M_k] P_k \quad (20)$$

In Eqs. (16)–(20), $$\vec{X}(k)$$

is the vector of a prediction state related to the phase difference display data SE at time k and is expressed by the following equation:

$$\vec{X}_k = \begin{bmatrix} \vec{\theta}^{(k)} \\ \vec{\omega}^{(k)} \\ \vec{\omega}'^{(k)} \end{bmatrix} \quad (21)$$

where $$\vec{\theta}(k)$$

is a predicted value of the phase difference display data SE at time k, $$\vec{\omega}(k)$$

a predicted value of the angular frequency at time k related to the phase difference display data SE and $$\vec{\omega}'(k)$$

a predicted value of the angular frequency changing ratio at time k related to the phase difference display data SE.

In Eqs. (16)–(20), $\Phi_k$ is a state transition matrix from time (k−1) to k which is related to the phase difference display data SE; the state transition matrix is expressed as follows:

$$\Phi_k = \begin{bmatrix} 1 & \Delta T & \Delta T^2/2 \\ 0 & 1 & \Delta T \\ 0 & 0 & 1 \end{bmatrix} \quad (22)$$

In Eqs. (16)–(20), $$\tilde{X}_{k-1}$$

is expressed as follows:

$$\tilde{X}_{k-1} = \begin{bmatrix} \tilde{\theta}^{(k-1)} \\ \tilde{\omega}^{(k-1)} \\ \tilde{\omega}'^{(k-1)} \end{bmatrix} \quad (23)$$

In Eqs. (16)–(20), $$\tilde{X}_k$$

is the vector of the maximum likelihood estimated value at time k which is related to phase difference display data SE; the vector $$\tilde{X}_k$$

is given by the following equation:

$$\tilde{X}_k = \begin{bmatrix} \tilde{\theta}^{(k)} \\ \tilde{\omega}^{(k)} \\ \tilde{\omega}'^{(k)} \end{bmatrix} \quad (24)$$

where $$\tilde{\theta}(k)$$

is a maximum likelihood estimated value of the phase difference display data SE at time k, $$\tilde{\omega}(k)$$

a maximum likelihood estimated value at time k which is related to the phase difference display data SE and $$\tilde{\omega}'(k)$$

a maximum likelihood estimated value of the angular frequency changing ratio at time k which is related to the phase difference display data SE.

In Eqs. (16)–(20), $A_k$ is a gain matrix at time k, that is, a weighted matrix related to the phase difference display data SE, which is expressed by the following equation:

$$A_k = \begin{bmatrix} A_1 \\ A_2 \\ A_3 \end{bmatrix}_{t=k} \quad (25)$$

where $A_1$, $A_2$ and $A_3$ are gains (weights) respectively corresponding to first, second and third vector elements counted from the top of the left-hand side of Eq. (21) or (24).

In Eqs. (16)–(20), $Y_k^*$ is an observation vector of the phase difference display data SE at time k, that is, the value of the data SE at time k. Letting the observation vector be represented by $\theta(k)^*$, it bear the relationship expressed as follows:

$$Y_k^* = \theta(k)^* \quad (26)$$

In Eqs. (16)–(20), $M_k$ is an observation matrix for the vector $$\vec{X}_k$$

of a predicted state at time k which is related to the phase difference display data SE; the observation matrix $M_k$ is given by $$M_k = [1\ 0\ 0] \quad (27)$$

In Eqs. (16)–(20), $P_k$ is an error covariance matrix of the vector $$\vec{X}_k$$

of the predicted state at time k expressed by Eq. (21); the vector $P_k$ is given by $$P_k = \begin{bmatrix} P_{11} & P_{12} & P_{13} \\ P_{21} & P_{22} & P_{23} \\ P_{31} & P_{32} & P_{33} \end{bmatrix}_{t=k} \quad (28)$$

Setting i=1, 2, 3 and j=1, 2, 3, when the signal presence display information SY transitions from its "1" state to its "0" state, or when the information SY in its "0" state, $P_{ij}$ takes a value "infinity" theoretically, but in practice, "1×10$^6$" every predetermined reset period $T_r$ shorter than the afore-mentioned period $T_{1-0}$ but longer than the reference period Ts of the code symbol of the four-phase PSK signal SO when i=j; and $P_{ij}$ take a value zero every predetermined reset period $T_r$ when i≠j.

In Eqs. (16)–(20), $J_{k-1}$ is expressed by $$J_{k-1} = \begin{bmatrix} J_{11} & J_{12} & J_{13} \\ J_{21} & J_{22} & J_{23} \\ J_{31} & J_{32} & J_{33} \end{bmatrix}_{t=k-1} \quad (29)$$

In Eqs. (16)–(20), $\Phi_k^t$ is expressed by a transposed matrix of the state transition matrix $\Phi_k$ given by Eq. (22).

In Eqs. (16)–(20), $V_k$ is a state transition noise covariance matrix of the vector $$\vec{x}_k$$

expressed by Eq. (21) and is given by the following equation:

$$V_k = \begin{bmatrix} V_{11} & 0 & 0 \\ 0 & V_{22} & 0 \\ 0 & 0 & V_{33} \end{bmatrix} \quad (30)$$

where $V_{11}$, $V_{22}$ and $V_{33}$ indicate adjustment elements which are constants.

In Eqs. (16)–(20), $M_k^t$ is expressed by a transposed matrix of the observation matrix $M_k$ of Eq. (27).

In Eqs. (16)–(20), $W_k$ is an observation error covariance matrix of θ(k)* of Eq. (26) which represents the value of the phase difference display data SE. Letting the observation error covariance matrix be represented by $[r_k]$, they bears the following relationship.

$$W_k = [r_k] \quad (31)$$

In Eqs. (16)–(20), $J_k$ is an error covariance matrix of the vector $$\tilde{x}(k)$$

of the maximum likelihood estimated state expressed by Eq. (24); the error covariance matrix $J_k$ is given by $$J_k = \begin{bmatrix} J_{11} & J_{12} & J_{13} \\ J_{21} & J_{22} & J_{23} \\ J_{31} & J_{32} & J_{33} \end{bmatrix}_{t=k} \quad (30)$$

Setting i=1, 2, 3 and j=1, 2, 3, when the signal presence display information SY goes from its "1" state to its "0" state, or when the information SY is in its "0" state, $J_{ij}$ takes a value "infinity" theoretically, but in practice, "1×10$^6$" every reset period $T_r$ mentioned previously when i=j; and $J_{ij}$ take a value zero every reset period $T_r$ when i≠j.

Incidentally, Eq. (16) of the vector $$\vec{x}_k$$

of the predicted state in Eqs. (16)–(20) which express the prediction filter based on the Kalman theory can be expressed by the following equation, using Eqs. (21), (22) and (23).

$$\begin{bmatrix} \vec{\theta}^{(k)} \\ \vec{\omega}^{(k)} \\ \vec{\omega}'^{(k)} \end{bmatrix} = \begin{bmatrix} 1 & \Delta T & \Delta T^2/2 \\ 0 & 1 & \Delta T \\ 0 & 0 & 1 \end{bmatrix} \begin{bmatrix} \tilde{\theta}^{(k-1)} \\ \tilde{\omega}^{(k-1)} \\ \tilde{\omega}'^{(k-1)} \end{bmatrix} \quad (33)$$

Therefore, the maximum likelihood estimated value $$\vec{\theta}_{(k)}$$

of the phase of the phase difference display data SE at time k is given by $$\vec{\theta}(k) = \tilde{\theta}(k-1) + \tilde{\omega}(k-1) \cdot \Delta T + \tilde{\omega}'(k-1) \cdot (\Delta T^2/2) \quad (34)$$

Here, $$\tilde{\omega}'(k-1) \cdot (\Delta T^2/2)$$

on the right-hand third term of Eq. (34) can be made zero when it is assumed that the angular frequency ω of the carrier of the four-phase PSK signal SO does not vary.

Therefore, when it is assumed that the angular frequency ω of the carrier of the four-phase PSK signal SO does not fluctuate, the predicted value $$\vec{\theta}_{(k)}$$

of the phase in the phase difference display data SE at time k, expressed by Eq. (34), can be given by $$\vec{\theta}(k) = \tilde{\theta}(k-1) + \tilde{\omega}(k-1) \cdot \Delta T \quad (35)$$

In Eq. (35), setting k=(k+1), it follows that $$\vec{\theta}(k+1) = \tilde{\theta}(k) + \tilde{\omega}(k) \cdot \Delta T \quad (36)$$

The predicted value $$\vec{\theta}(k+1)$$

given by Eq. (36) represents the predicted value of the phase of the phase difference display data SE at time (k+1) and corresponds to the phase correcting data SQ expressed by Eq. (15).

Thus, by applying the above-described prediction filter to the phase correcting data generating means 32 and by using the predicted value $$\vec{\theta}(k+1)$$

of the phase of the phase difference display data SE at time (k+1) expressed by Eq. (36), the phase correcting data SQ can be obtained from the phase correcting data generating means 32.

With the four-phase PSK signal decoder of the above-described construction according to the present invention, since the carrier of the reference signal SR-O by the reference signal generating means 51 has an angular frequency $ω_0$ which is not controlled in accordance with the angular frequency ω of the carrier of the four-phase PSK signal SO to be input into the first and second quasi-synchronous phase detecting means 2-1 and 2-1, the first and second quasi-synchronous phase detecting signals SD-1 and SD-2 which are generated by the first and second quasi-synchronous phase detecting means 2-1 and 2-2 are not such synchronous phase detecting signals as are provided from the first and second synchronous phase detecting means 2'-1 and 2'-2 of the conventional four-phase PSK signal decoder depicted in FIG. 7.

In this embodiment, however, the first and second digitized quasi-synchronous phase detecting signals SH-1 and SH-2 by the first and second quasi-synchronous phase detecting means SD-1 and SD-2 are obtained from the first and second digital converting means 5-1 and 5-2 through use of the sampling signal SM; furthermore, the third and fourth digitized quasi-synchronous phase detecting signals SH-3 and SH-4, which are phase-corrected versions of the first and second digitized quasi-synchronous phase detecting signals SH-1 and SH-2, are obtained from the phase correcting means 6 through use of the phase correcting data SQ. Based on the third and fourth digitized quasi-synchronous phase detecting signals SH-3 and SH-4, the decoded digital code SC, which represents the code indicating communication information of the four-phase PSK signal SO, is obtained from the decoded digital code generating means 11.

Thus, as is the case with the conventional four-phase PSK signal decoder of FIG. 7, the decoder of this embodiment makes it possible to obtain the decoded digital code SC with no code error and with ease in the steady state of the four-phase PSK signal SO.

With the four-phase PSK signal decoder of the FIG. 1 embodiment, the phase correcting data generating means 32 generates, as the phase correcting data SQ, data which represents the phase contain in the data indicating the predicted angular frequency and phase of the four-phase PSK signal SO, from the phase difference display data SE.

Hence, though not described in detail, the four-phase PSK signal decoder of the FIG. 1 embodiment effectively avoids the afore-mentioned defects of the conventional four-phase PSK signal decoder of FIG. 7.

This advantage is assured all the more because the phase correcting data generating means 32 is implemented by the prediction filter based on the Kalman filter theory which has a variable bandwidth characteristic.

[Embodiment 2]

Figure 2:
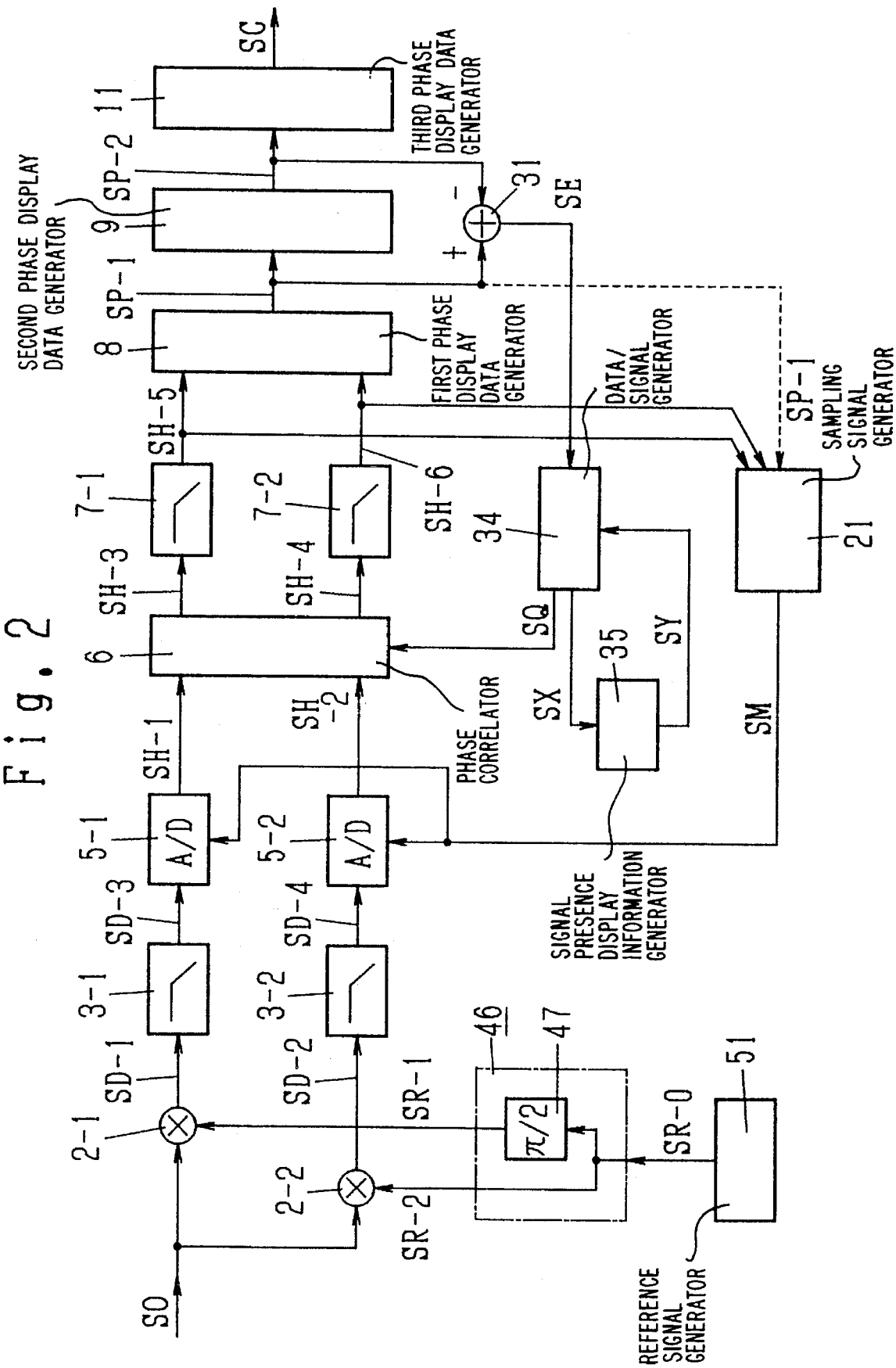
FIG. 2 is a block diagram illustrating a second embodiment of the present invention.

Next, a description will be given, with reference to FIG. 2, of a second embodiment of the present invention. In FIG. 2 the parts corresponding to those in FIG. 1 are identified by the same reference numerals and no detailed description will be made of them.

This embodiment is identical in construction with the FIG. 1 embodiment except that the signal presence display information generating means 33 in the latter is replaced with signal presence display information generating means 35 and the phase correcting data generating means 32 with phase correcting data/signal presence display information generating signal generating means 34.

The signal presence display information generating means 35 derives, from a signal presence display information generating signal SX by the data/signal generating means 34, signal presence display information SY composed of a signal which is low ("0") or high ("1") depending on whether the amplitude of the four-phase PSK signal SO which is input into the first and second quasi-synchronous phase detecting means 2-1 and 2-2 is smaller or larger than the predetermined threshold value.

The signal presence display information generating means 35 can be configured so that it calculates a signal of the absolute value of the signal presence display information generating signal SX, represented by |SX|, then calculates a smoothed signal presence display information generating signal, represented by the following equation, and then compares the smooth signal presence display information generating signal with a predetermined threshold value.

$$\overline{|SX|} = \overline{|SE - \vec{\theta}^{(k)}|} \tag{37}$$

It is evident from the reasons given below that when the signal presence display information generating means 35 has the construction described just above, the signal presence display information SY available therefrom is in the "0" or "1" state depending on whether the amplitude of the four-phase PSK signal SO for input into the first and second quasi-synchronous phase detecting means 2-1 and 2-2 is smaller or larger than the predetermined threshold value. That is, when the amplitude A on the right-hand first term in Eqs. (7-1) and (7-2), which express the first and second digitized quasi-synchronous phase detecting signals SH-1 and SH-2, is zero or sufficiently smaller than the noises $n_a(k)$ and $n_a'(k)$ on the right-hand second term, the signal presence display information generating signal SX is distributed uniformly over the entire phase domain ranging from 0 to π and from 0 to −π, and hence the absolute value |SX| of the signal presence display information generating signal SX is distributed uniformly over the entire phase domain from 0 to π; thus, the smoothed signal $$\overline{|SX|}$$

of the absolute value $$\overline{|SX|}$$

is obtained as a value π/2 or close thereto. When the amplitude A on the right-hand first term in Eqs. (7-1) and (7-2) has a value sufficiently larger than noises $n_a(k)$ and $n_a'(k)$, the signal presence display information SX is 0 or distributed only around it, and hence the absolute value $$|SX|$$

is 0 or distributed only around it, thus, the smoothed signal $$\overline{|SX|}$$

is obtained as a value 0 or close thereto.

Incidentally, the time for transition of the signal presence display information SY between its "1" and "0" states, which takes place in response to the transition of the amplitude of the four-phase PSK signal SO between values smaller and larger than the predetermined threshold value, is the same as described previously in respect of Embodiment 1.

The data/signal generating means 34 uses the phase difference display data SE available from the phase difference display data generating means 31 and the signal presence display information SY from the signal presence display information generating means 35 (the same as that generated by the signal presence display information generating means 33 in FIG. 1) to generate the phase correcting data SQ of Eq. (15) (the same as that generated by the phase correcting data generating means 32 in FIG. 1) and the signal presence information generating signal SX.

The signal presence display information generating signal SX is expressed by a difference between the phase difference display data SE of Eq. (14) or (14') by the phase difference display data generating means 31 and the phase difference correcting data SQ'(having (K+1) of the phase correcting data SQ of Eq. (15) set to K) by the data/signal generating means 34, that is, $$\vec{\theta}_a(k)$$

; the signal SX is given by $$SX = SE - SQ' = SE - \vec{\theta}_a(k) \qquad (38)$$

The date/signal generating means 34 for generating the phase correcting data SQ and the signal presence display information generating signal SX can also be implemented by the prediction filter based on the Kalman filter theory which is supplied with the phase difference display data SE and controlled by the signal presence display information SY.

In this instance, the phase correcting data SQ can be obtained by use of the predicted value $$\vec{\theta}_a(k+1)$$

of the phase of the phase difference display data SE at time (k+1), given by Eq. (36), as described previously with respect to Embodiment 1. The signal presence display information generating signal SX can be obtained by use of the phase difference display data SE and the predicted value $$\vec{\theta}(k)$$

of the phase of the phase difference display data SE at time k, given by Eq. (14) or (14').

It will be understood that the four-phase PSK signal decoder of the above-described a construction produces the effects referred to previously in Embodiment 1.

[Embodiment 3]

Figure 4:
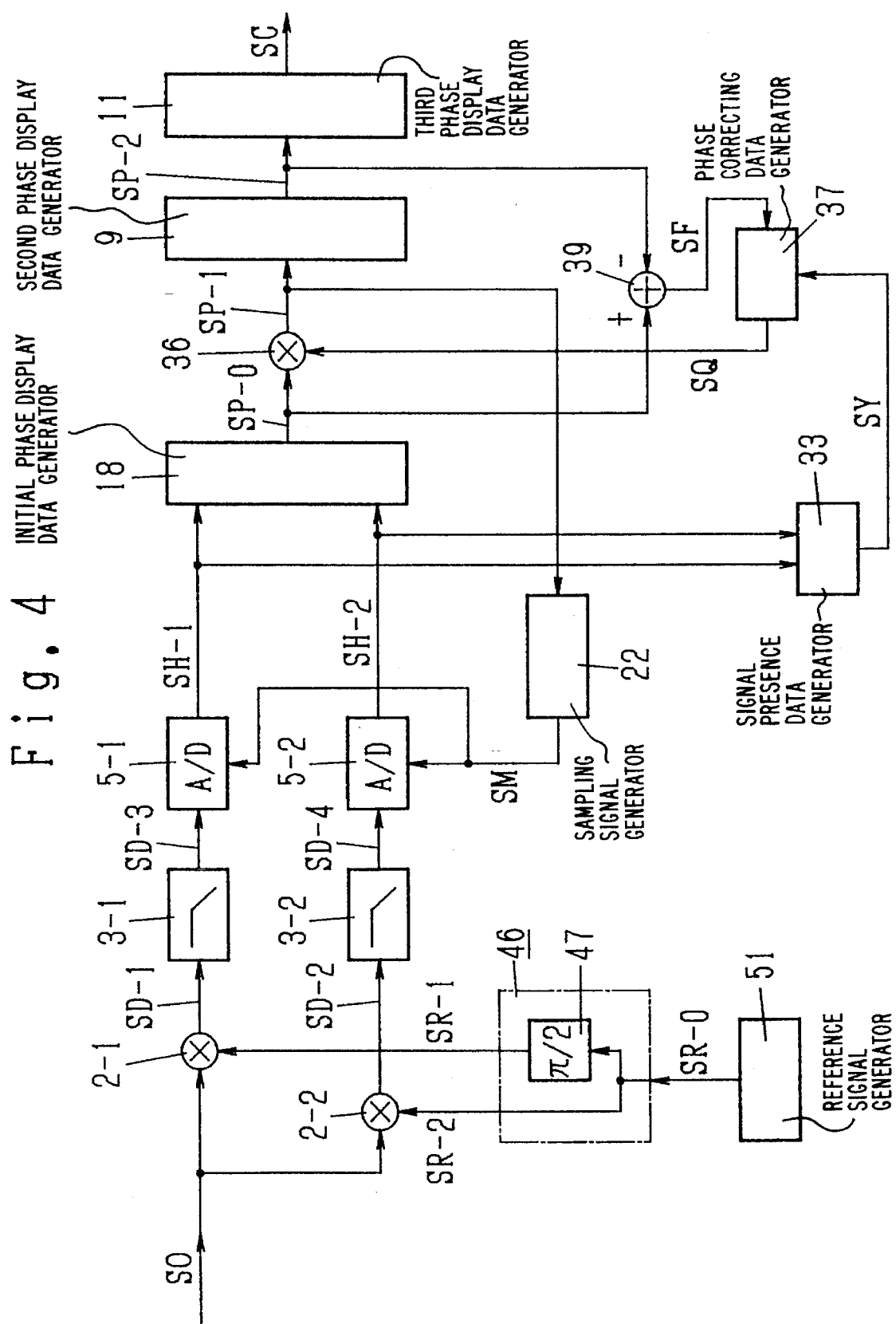
FIG. 4 is a block diagram illustrating a third embodiment of the present invention.

Turning now to FIG. 4, a third embodiment of the present invention will hereunder be described. In FIG. 4, the parts corresponding to those in FIG. 1 are identified by the same reference numerals and no detailed description will be given of them.

The four-phase PSK signal decoder of this embodiment has the reference signal generating means 51, the phase detecting reference signal generating means 46, the quasi-synchronous phase detecting means 2-1 and 2-1, the first and second low-pass filter means 3-1 and 3-1 and the first and second digital converting means 5-1 and 5-2 which are the same as those used in the FIG. 1 embodiment.

In this embodiment, however, the sampling signal SM for use in the first and second digital converting means 5-1 and 5-2 is produced by sampling signal generating means 22 which differs from that employed in Embodiment 1.

The four-phase PSK signal decoder of this embodiment further includes: first phase display data generating means 18; phase correcting means 36; second phase display data generating means 9; decoded digital code generating means 11; sampling signal generating means 22; phase difference display data generating means 39; signal presence display information generating means 33; and phase correcting data generating means 37.

The first phase display data generating means 18, which is different from that 8 employed in Embodiment 1, generates, from the first and second digitized quasi-synchronous phase detecting signals SH-1 and SH-2 of Eqs. (7-1) and (7-2) by the first and second digital converting means 5-1 and 5-2, the phase $(\Delta\omega \cdot k \cdot \Delta T + \Delta\theta(k))$ on the right-hand first term in Eqs. (7-1) and (7-2) as first phase display data SP-O which represents the carrier phase of the four-phase PSK signal SO and differs from the first phase display data SP-1 in the FIG. 1 embodiment.

Letting the phase noise corresponding to the noise $n_a(k)$ and $n_a'(k)$ on the right-hand second term in Eqs. (7-1) and (7-2) be represented by $\theta_o(k)$, the first phase display data SP-O is expressed by the following equation, using Eqs. (7-1), (7-2) and (8).

$$SP-O = (\Delta\omega \cdot k \cdot \Delta T + \theta(k) - \theta_0) + \theta_c(k) \qquad (9)$$

The first phase display data SP-O given by Eq. (9) can be obtained by performing the following calculation in the first phase display data generating means 18 through use of Eqs. (7-1), (7-2) and (8).

$$\tan^{-1}(A\sin(\Delta\omega \cdot k \cdot \Delta T + \theta(k) - \theta_0) + _a(k))$$

$$/(A\cos(\Delta\omega \cdot k \cdot \Delta T + \theta(k) - \theta_0) + n_a'(k))$$

The phase correcting data generating means 36 derives, from the above-mentioned first phase display data SP-O, second phase display data SP-1 which is composed of a signal obtained by correcting the phase $[(\Delta\omega \cdot k \cdot \Delta T + \theta(k)) - \theta_0) + \theta_c(k)]$ of Eq. (9) with the phase correcting data SQ and is expressed by Eq. (12) as or (12') is the case with the data generated by the first phase display data generating means 8 in FIG. 1 embodiment.

Here, the second phase display data SP-1 is obtained by correcting the phase $(\Delta\omega \cdot k \cdot \Delta T - \theta_0)$ on the right-hand side of Eq. (9), representing the first phase display data SP-O, by $$(\tilde{\theta}(k) + \tilde{\omega}(k) \cdot \Delta T)$$

on the right-hand first term of Eq. (15) representing the phase correcting data SQ available from phase correcting data generating means 37 described later.

The second phase display data generating means 9 is identical with that used in Embodiment 1 and derives, from the second phase display data SP-1, third phase display data SP-2 which indicates the phase assigned to the symbol representing the communication information of the four-phase PSK signal SO. The third phase display data SP-2 is the same as that SP-2 (shown in Table 2) which is generated by the second phase display data generating means 9 in Embodiment 1.

The decoded digital code generating means 11 is the same as that used in Embodiment 1 to generate the decoded digital code SC shown in Table 3.

The sampling signal generating means 22 derives, from the second phase display data SP-1, the same sampling signal SM as that produced by the sampling sinal generating means 21 in Embodiment 1 and given by Eq. (13).

The sampling signal generating means 22 may be constructed as shown in FIG. 6 in the case of generating the sampling signal SM of Eq. (13) through utilization of the second phase display data SP-1.

The sampling signal generating means 22 comprises: clock pulse generating means 65 and sampling reference period display data generating means 66 which are the same as those of the sampling signal generating means 21 depicted in FIG. 3; time difference display data generating means 70; sampling synchronization error timing display data generating means 68; correcting sampling period display data generating means 69 which is the same as that of the sampling signal generating means 21; and count means 60 which is the same as that of the sampling signal generating means 21.

Each time the phase angle of the second phase display data SP-1 from the phase correcting means 36 switches between the state in which to satisfy one condition in Table 2 at time $t_a$ corresponding to a point in time when one wave $W_a$ of the sampling signal SM is obtained and the state in which to satisfy another condition in Table 2 at time $t_b$ corresponding to a point in time when the next wave $W_b$ of the sampling signal SM is obtained, the time difference display data generating means 70 generates the same time difference display data DG as in the FIG. 3 embodiment which represents, by the number $\Delta N_G$ of clock pulses CP available from the clock pulse generating means 65, a time difference $\Delta T_G$ ($=T_{MS}-T_{MC}$), where $T_{MS}$ is a predetermined reference time interval from time $t_M$ of that one of symbols of the four-phase PSK signal SO which is the closest to an actual phase angle changing time $t_c$ when the phase angle takes a value $\theta_c$ intermediate between values $\theta_a$ and $\theta_b$ at times $t_a$ and $t_b$ to a predetermined reference phase angle changing time $t_a$ corresponding to the actual phase angle changing time $t_c$ viewed from time $t_M$ and $T_{MC}$ is the real time interval from time $t_M$ to the actual phase angle changing time $t_c$. The time difference display data generating means 70 can easily be constructed in various forms.

The sampling synchronization error timing display data generating means 68 is the same as that used in the sampling signal generating means 21 of the FIG. 3 embodiment; hence, it derives, from the above-mentioned time difference display data DG by the time difference display data generating means 70, the same sampling synchronization error timing display data DE as that described previously with respect to FIG. 3.

The sampling signal generating means 22 of such a construction as shown in FIG. 6 has no means with a large time constant as is the case with the sampling signal generating means 21 in FIG. 3; hence, the decoded digital code generating means 11 is allowed to quickly generate the decoded digital code SC at a low error rate.

The phase difference display data generating means 39 of the four-phase PSK signal decoder of this embodiment generates phase difference display data SF which represents a difference, ((SP-0)-(SD-2)), between the first phase display data SP-0 available from the first phase display data generating means 18 and the third phase display data SP-2 from the second phase display data generating means 9.

The phase difference display data SF is expressed by the following equation, using the phase (corresponding to $\theta_a(k)$ in Eq. (9) shown in the column "SP-2" of Table 2.

$$SF=(SP-0)-(SP-2)=(\Delta\omega\cdot k\cdot \Delta T-\theta_0)+\theta_c(k) \quad (14A)$$

The signal presence information generating means 33 used in this embodiment is the same as in respect of Embodiment 1 and generates the same information SY as described previously in respect of Embodiment 1.

The phase correcting data generating means 37 used in this embodiment derives, from the phase difference display data SF, the same phase correcting data SQ as in Embodiment 1 when the amplitude of the four-phase PSK signal SO to be input into the first and second quasi-synchronous phase detecting means 2-1 and 2-2 is larger than a predetermined threshold value, that is, when the signal presence display information SY is in the "1" state. The phase correcting data SQ in this instance is data that represents a phase $\vec{\theta}(k+1)$ contained in data indicating the angular frequency $\vec{\omega}(k+1)$ and the phase $\vec{\theta}(k+1)$ of the angular frequency $\omega(k+1)$ and the phase $\theta(k+1)$ of the carrier of the four-phase PSK signal SO which are predicted using estimated versions $\tilde{\omega}(k)$ and $\tilde{\theta}(k)$ of the angular frequency $\omega(k)$ and the phase $\theta(k)$ of the carrier of the PSK signal SO. When the signal presence display information SY goes from the "1" to the "0" state in which the amplitude of the four-phase PSK signal SO is smaller the predetermined threshold value, the phase correcting data generating means 37 provides, as the phase correcting data SQ, data that represents the phase $\vec{\theta}(k+1)$ contained in data indicating the angular frequency $\vec{\omega}(k+1)$ and the phase $\vec{\theta}(k+1)$ of the angular frequency ($\omega+1$) and the phase $\theta(k+1)$ of the carrier of the four-phase PSK signal SO which are predicted using the above-mentioned estimated angular frequency $\tilde{\omega}(k+1)$ and phase $\vec{\theta}(k+1)$ The phase correcting data SQ is generally given by Eq. (15) mentioned previously with respect to Embodiment 1.

The phase correcting data generating means 37 can also be implemented by the prediction filter based on the Kalman filter theory.

Thus, by applying the prediction filter to the phase correcting data generating means 37 and by using the maximum likelihood estimated $\vec{\theta}(k+1)$ value of the phase difference display data SF at time (k+1) which is expressed by Eq. (36), the phase correcting data SQ expressed by Eq. (13) can be obtained from the phase correcting data generating means 37.

It is apparent that the four-phase PSK signal decoder of the above-described construction is able to produce the same effects as referred to previously in Embodiment 1, though not described in detail.

Embodiment 4

Figure 5:
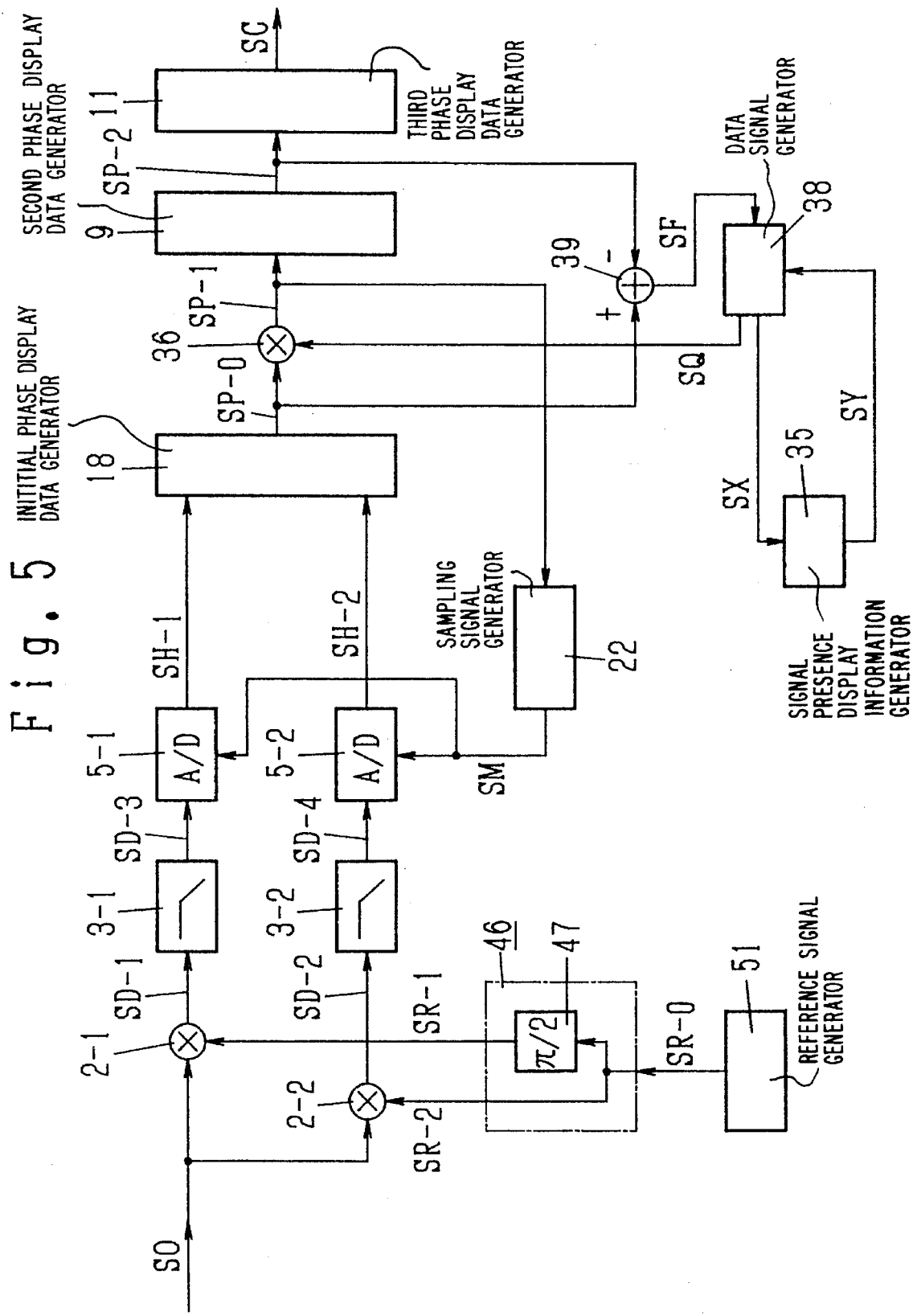
FIG. 5 is a block diagram illustrating a fourth embodiment of the present invention.

Turning next to FIG. 5, a fourth embodiment of the present invention will be described. The parts corresponding to those in FIG. 4 are identified by the same reference numerals and no detailed description will be given of them.

This embodiment is identical in construction with the FIG. 4 embodiment except that the signal presence display information generating means 33 in the latter is replaced with the signal presence display information generating means 35 used in Embodiment 2 and the phase correcting data generating means 37 in FIG. 4 with the data/signal generating means 38 used in Embodiment 2.

The signal presence display information generating means 35 uses the signal presence display information generating signal SX from the signal generating means 38 to generate the same signal presence display information SY as in Embodiment 2; hence, no description will be given of the signal presence display information generating means 35.

The data/signal generating means 38 uses the phase difference display data SE from the phase difference display data generating means 31 and the signal presence display information SY from the signal presence information generating means 35 to generate the phase correcting data SQ of Eq. (15) and the signal presence display information generating signal SX of Eq. (38) which are the same as those produced by the data/signal generating means 34 in Embodiment 2.

The data/signal generating means 38 can also be implemented by the prediction filter based on the Kalman filter theory as is the case with Embodiment 2.

It is apparent that the four-phase PSK signal decoder of the above-described construction is able to produce the same effects as referred to previously in Embodiment 1, though not described in detail.

The embodiments described above are merely illustrative of the present invention; it is also possible, in the FIG. 1 embodiment, to omit the low-pass filter means 3-1 and 3-2 and apply the first and second quasi-synchronous phase detecting signals SD-1 and SD-2 from the first and second quasi-synchronous phase detecting means 2-1 and 2-2 to the first and second digital converting means 5-1 and 5-2.

While in the above the present invention has been described as being applied to the four-phase PSK signal decoder, it is evident that the invention is applicable to two-, eight-, 16- and other multi-phase PSK signal decoders as well.

Various other modifications and variations may be effected without departing from the spirits of the present invention.

What is claimed is:

1. A multi-phase PSK signal decoder comprising:

(A) reference signal generating means for generating a reference signal of a frequency or angular frequency corresponding to that of a carrier of a multi-phase PSK signal according to a multi-phase PSK system;

(B) phase detecting reference signal generating means for generating, from said reference signal, first and second phase detecting reference signals which have the same frequency or angular frequency as that of said reference signal and are displaced $\pi/2$ apart in phase;

(C) first and second quasi-synchronous phase detecting means for generating, from said multi-phase PSK signal, first and second quasi-synchronous phase detecting signals quasi-synchronously detected by said first and second phase detecting reference signals of the same phase as that of said multi-phase PSK signal;

(D) first and second digital converting means for generating, from said first and second quasi-synchronous phase detecting signals, first and second digitized quasi-synchronous phase detecting signals by use of a sampling signal;

(E) phase correcting means for generating, from said first and second digitized quasi-synchronous phase detecting signals, third and fourth digitized quasi-synchronous phase shifting signals corrected by phase correcting data of the same phase as those of said first and second digitized quasi-synchronous phase detecting signals;

(F) first and second low-pass filter means for generating, from said third and fourth quasi-synchronous phase detecting signals, fifth and sixth digitized quasi-synchronous phase detecting signals composed of their low-frequency components;

(G) first phase display data generating means for generating, from said fifth and sixth digitized quasi-synchronous phase detecting signals, first phase display data representing the phase of the carrier of said multi-phase PSK signal;

(H) second phase display data generating means for generating, from said first phase display data, second phase display data representing the phase assigned to a code of said multi-phase PSK signal;

(I) decoded digital code generating means for generating, from said second phase display data, a decoded digital code representing the code of said multi-phase PSK signal;

(J) sampling signal generating means for generating, as said sampling signal, a signal of timing synchronized with that of the code of said multi-phase PSK signal, from said first phase display data or either one or both of said fifth and sixth digitized quasi-synchronous phase detecting signals;

(K) phase difference display data generating means for generating phase difference data representing a difference between said first and second phase display data (L) signal presence display information generating means for generating, from either one or both of said first and second digitized quasi-synchronous phase detecting signals, signal presence display information representing whether the amplitude of said multi-phase PSK signal to be input into said first and second quasi-synchronous phase detecting means is smaller or larger than a predetermined threshold value; and (M) phase correcting data generating means; (i) which, when said signal presence display information is in its state representing that the amplitude of said multi-phase PSK signal is larger than the predetermined threshold value, estimates the frequency or angular frequency and phase of the carrier of said multi-phase PSK signal from said phase difference display data, then predicts the frequency or angular frequency and phase of the carrier of said multi-phase PSK signal from said estimated frequency or angular frequency and phase thereof and generates, as said phase correcting data, data which represents the phase contained in data representing said predicted frequency or angular frequency and phase; and (ii) which, when said signal presence display information changes from its state representing that the amplitude of said multi-phase PSK signal is larger than the threshold value to its state representing that the amplitude of said multi-phase PSK signal is smaller than the predetermined threshold value, predicts the frequency or angular frequency and phase of the carrier of said multi-phase PSK signal from those estimated until then and generates, as said phase correcting data, data which represents the phase contained in data representing said predicted frequency or angular frequency and phase.

2. A multi-phase PSK signal decoder comprising:

(A) reference signal generating means for generating a reference signal of a frequency or angular frequency corresponding to that of a carrier of a multi-phase PSK signal according to a multi-phase PSK system;

(B) phase detecting reference signal generating means for generating, from said reference signal, first and second phase detecting reference signals which have the same frequency or angular frequency as that of said reference signal and are displaced $\pi/2$ apart in phase;

(C) first and second quasi-synchronous phase detecting means for generating, from said multi-phase PSK signal, first and second quasi-synchronous phase detecting signals quasi-synchronously detected by said first and second phase detecting reference signals of the same phase as that of said multi-phase PSK signal;

(D) first and second digital converting means for generating, from said first and second quasi-synchronous phase detecting signals, first and second digitized quasi-synchronous phase detecting signals by use of a sampling signal;

(E) phase correcting means for generating, from said first and second digitized quasi-synchronous phase detecting signals, third and fourth digitized quasi-synchronous phase shifting signals corrected by phase correcting data of the same phase as those of said first and second digitized quasi-synchronous phase detecting signals;

(F) first and second low-pass filter means for generating, from said third and fourth quasi-synchronous phase detecting signals, fifth and sixth digitized quasi-synchronous phase detecting signals composed of their low-frequency components;

(G) first phase display data generating means for generating, from said fifth and sixth digitized quasi-synchronous phase detecting signals, first phase display data representing the phase of the carrier of said multi-phase PSK signal;

(H) second phase display data generating means for generating, from said first phase display data, second phase display data representing the phase assigned to a code of said multi-phase PSK signal;

(I) decoded digital code generating means for generating, from said second phase display data, a decoded digital code representing a digital code of said multi-phase PSK signal;

(J) sampling signal generating means for generating, as said sampling signal, a signal of timing synchronized with that of the code of said multi-phase PSK signal, from said first phase display data or either one or both of said fifth and sixth digitized quasi-synchronous phase detecting signals;

(K) phase difference display data generating means for generating phase difference data representing a difference between said first and second pieces of phase display data (L) signal presence display information generating means which (i) generates, from a signal presence display information generating signal by phase correcting data/ signal presence display information generating signal generating means, a smoothed signal presence display information generating signal having its absolute value smoothed and (ii) generates, from said smoothed signal presence display information generating signal, signal presence display information which represents whether the amplitude of said multi-phase PSK signal to be input into said first and second quasi-synchronous phase detecting means is smaller or larger a said predetermined threshold value; and (M) phase correcting data/signal presence display information generating signal generating means; (i) which, when said signal presence display information is in the state representing that the amplitude of said multi-phase PSK signal to be input into said first and second quasi-synchronous phase detecting means is larger than said predetermined threshold value, estimates the frequency or angular frequency and phase of the carrier of said multi-phase PSK signal from said phase difference display data, then predicts the frequency or angular frequency and phase of the carrier of said multi-phase PSK signal from said estimated frequency or angular frequency and phase thereof and generates, as said phase correcting data, data which represents the phase contain in data representing said predicted frequency or angular frequency and phase; (ii) which, when said signal presence display information changes its state representing that the amplitude of said multi-phase PSK signal is larger than said predetermined threshold value to its state representing that the amplitude of said multi-phase PSK signal is smaller than said predetermined threshold value, predicts the frequency or angular frequency and phase of the carrier of said multi-phase PSK signal from those estimated until then and generates, as said phase correcting data, data which represents the phase contain in data representing said predicted frequency or angular frequency and phase; and (iii) which calculates a difference between said phase difference display data and that of said phase correcting data provided at time immediately preceding the current time and generates said difference as said signal presence display information generating signal.

3. The decoder of claim 1 or 2, wherein said sampling signal generating means comprises:

(i) clock pulse generating means which generates clock pulses of a period which is 1/k (where k is a relatively large integer) of the reference period of the symbol representing communication information of said multi-phase PSK signal;

(ii) sampling reference period display data generating means which generates sampling reference period display data which represents a period 1/m (where m is an integer smaller than said k) of the reference period of said symbol of said multi-phase PSK signal, as the sampling reference period, by the number of clock pulses from said clock pulse generating means;

(iii) time difference display data generating means which, upon each transition of the amplitude of said seventh digitized quasi-synchronous phase detecting signal between a value ("1" in binary representation) larger than a predetermined threshold value at time $t_a$ corresponding to a point in time when one wave $W_a$ of said sampling signal is obtained and a value ("0" in binary representation) at time $t_b$ corresponding to a point in time when the next wave $W_b$ of said sampling signal is obtained, generates time difference display data which represents, by the number of clock pulses available from said clock pulse generating means, a time difference between a predetermined reference time interval from time corresponding to that one of symbols of the four-phase PSK signal which is closest to an actual amplitude changing time when said seventh digitized quasi-synchronous phase detecting signal takes a value intermediate between values at time $t_a$ and $t_b$ to a predetermined reference amplitude changing time corresponding to said actual amplitude changing time viewed from said time of said one symbol and the real time interval from said time of said one symbol to said actual amplitude changing time;

(iv) sampling synchronization error timing display data generating means formed by low-pass filter means which generates, from said time difference display data, sampling synchronization error timing display data which represents, by the number of clock pulses from said clock pulse generating means, a smoothed version of said time difference as sampling synchronization error timing;

(v) correcting sampling synchronization display data generating means which generates correcting sampling period display data which represents, by the number of clock pulses, the sum of said sampling reference period and said sampling synchronization error timing as a correcting sampling period;

(vi) count means which counts said clock pulses from said clock pulse generating means and, upon each coincidence of the count value with said number of clock pulses represented by said correcting sampling period represented, in turn, by said correcting sampling period display data, outputs one wave as one wave of said sampling signal.

4. A multi-phase PSK signal decoder comprising:

(A) reference signal generating means for generating a reference signal of a frequency or angular frequency corresponding to that of a carrier of a multi-phase PSK signal according to a multi-phase PSK system;

(B) phase detecting reference signal generating means for generating, from said reference signal, first and second phase detecting reference signals which have the same frequency or angular frequency as that of said reference signal and are displaced π/2 apart in phase;

(C) first and second quasi-synchronous phase detecting means for generating, from said multi-phase PSK signal, first and second quasi-synchronous phase detecting signals quasi-synchronously detected by said first and second phase detecting reference signals of the same phase as that of said multi-phase PSK signal;

(D) first and second digital converting means for generating, from said first and second quasi-synchronous phase detecting signals, first and second digitized quasi-synchronous phase detecting signals by use of a sampling signals;

(E) first phase display data generating means for generating first phase display data representing the phase of the carrier of said multi-phase PSK signal from said first and second digitized quasi-synchronous phase detecting signals;

(F) phase correcting means for generating second phase display data comosed of a signal corrected by said phase correcting data, from said first phase display data;

(G) second phase display data generating means for generating third phase display data representing the phase assigned to the code of said multi-phase PSK signal, from said second phase display data;

(H) decoded digital code generating means for generating decoded digital code representing the digital code of said multi-phase PSK signal, from said third phase display data;

(I) sampling signal generating means for generating, as a sampling signal, a signal of timing synchronized with the code of said multi-phase PSK signal, from said second phase display data;

(J) phase difference display data generating means for generating phase difference display data which representing a difference between said first and third phase display data;

(K) signal presence display information generating means for generating, from either one or both of said first and second digitized quasi-synchronous phase detecting signals, signal presence display information composed of a signal representing whether the amplitude of said multi-phase PSK signal to be input into said first and second quasi-synchronous phase detecting means is smaller or larger than a predetermined threshold value; and (L) phase correcting data generating means: (i) which, when said signal presence display information is in its state representing that the amplitude of said multi-phase PSK signal is larger than the predetermined threshold value, estimates the frequency or angular frequency and phase of the carrier of said multi-phase PSK signal from said phase difference display data, then predicts the frequency or angular frequency and phase of the carrier of said multi-phase PSK signal from said estimated frequency or angular frequency and phase thereof and generates, as said phase correcting data, data which represents the phase contained in data representing said predicted frequency or angular frequency and phase; and (ii) which, when said signal presence display information changes from its state representing that the amplitude of said multi-phase PSK signal is larger than the threshold value to its state representing that the amplitude of said multi-phase PSK signal is smaller than the predetermined threshold value, predicts the frequency or angular frequency and phase of the carrier of said multi-phase PSK signal from those estimated until then and generates, as said phase correcting data, data which represents the phase contained in data representing said predicted frequency or angular frequency and phase.

5. A multi-phase PSK signal decoder comprising:

(A) reference signal generating means for generating a reference signal of a frequency or angular frequency corresponding to that of a carrier of a multi-phase PSK signal according to a multi-phase PSK system;

(B) phase detecting reference signal generating means for generating, from said reference signal, first and second phase detecting reference signals which have the same frequency or angular frequency as that of said reference signal and are displaced π/2 apart in phase;

(C) first and second quasi-synchronous phase detecting means for generating, from said multi-phase PSK signal, first and second quasi-synchronous phase detecting signals quasi-synchronously detected by said first and second phase detecting reference signals of the same phase as that of said multi-phase PSK signal;

(D) first and second digital converting means for generating, from said first and second quasi-synchronous phase detecting signals, first and second digitized quasi-synchronous phase detecting signals by use of a sampling signal;

(E) first phase display data generating means for generating first phase display data representing the phase of the carrier of said multi-phase PSK signal from said first and second digitized quasi-synchronous phase detecting sinals;

(F) phase correcting means for generating second phase display data comosed of a signal corrected by said phase correcting data, from said first phase display data;

(G) second phase display data generating means for generating third phase display data representing the phase assined to the code of said multi-phase PSK signal, from said second phase display data;

(H) decoded digital code generating means for generating decoded digital code representing the digital code of said multi-phase PSK signal, from said third phase display data;

(I) sampling signal generating means for generating, as a sampling signal, a signal of timing synchronized with the code of said multi-phase PSK signal, from said second phase display data;

(J) phase difference display data generating means for generating phase difference display data which representing a difference between said first and third phase display data;

(K) signal presence display information generating means which (i) generates, from a signal presence display information generating signal by phase correcting data/ signal presence display information generating signal generating means, a smoothed signal presence display information generating signal having its absolute value smoothed and (ii) generates, from said smoothed signal presence display information generating signal, signal presence display information which represents whether the amplitude of said multi-phase PSK signal to be input into said first and second quasi-synchronous phase detecting means is smaller or larger than a predetermined threshold value; and (L) phase correcting data/signal presence display information generating signal generating means: (i) which, when said signal presence display information is in the state representing that the amplitude of said multi-phase PSK signal to be input into said first and second quasi-synchronous phase detecting means is larger than said predetermined threshold value, estimates the frequency or angular frequency and phase of the carrier of said multi-phase PSK signal from said phase difference display data, then predicts the frequency or angular frequency and phase of the carrier of said multi-phase PSK signal from said estimated frequency or angular frequency and phase thereof and generates, as said phase correcting data, data which represents the phase contain in data representing said predicted frequency or angular frequency and phase; (ii) which, when said signal presence display information changes its state representing that the amplitude of said multi-phase PSK signal is larger than said predetermined threshold value to its state representing that the amplitude of said multi-phase PSK signal is smaller than said predetermined threshold value, predicts the frequency or angular frequency and phase of the carrier of said multi-phase PSK signal from those estimated until then and generates, as said phase correcting data, data which represents the phase contain in data representing said predicted frequency or angular frequency and phase; and (iii) which calculates a difference between said phase difference display data and that of said phase correcting data provided at time immediately preceding the current time and generates said difference as said signal presence display information generating signal.

6. The multi-phase PSK signal decoder of claim 4 or 5, wherein said sampling signal generating means comprises:

(i) clock pulse generating means which generates clock pulses of a period which is 1/k (where k is a relatively large integer) of the reference period of the symbol representing communication information of said multi-phase PSK signal;

(ii) sampling reference period display data generating means which generates sampling reference period display data which represents a period 1/m (where m is an integer smaller than said k) the reference period of said symbol of said multi-phase PSK signal, as the sampling reference period, by the number of clock pulses from said clock pulse generating means;

(iii) time difference display data generating means which, upon each transition of the phase of said second phase display data between a value ("1" in binary representation) larger than a predetermined threshold value at time $t_a$ corresponding to a point in time when one wave $W_a$ of said sampling signal is obtained and a value ("0" in binary representation) at time $t_b$ corresponding to a point in time when the next wave $W_b$ of said sampling signal is obtained, generates time difference display data which represents, by the number of clock pulses available from said clock pulse generating means, a time difference between a predetermined reference time interval from time corresponding to that one of symbols of the four-phase PSK signal which is closest to an actual phase changing time when said second phase display data takes a value intermediate between values at times $t_a$ and tb to a predetermined reference phase changing time corresponding to said actual phase changing time viewed from said time of said one symbol and the real time interval from said time of said one symbol to said actual phase changing time;

(iv) sampling synchronization error timing display data generating means formed by low-pass filter means which generates, from said time difference display data, sampling synchronization error timing display data which represents, by the number of clock pulses from said clock pulse generating means, a smoothed version of said time difference as sampling synchronization error timing;

(v) correcting sampling synchronization display data generating means which generates correcting sampling period display data which represents, by the number of clock pulses, the sum of said sampling reference period and said sampling synchronization error timing as a correcting sampling period; and (vi) count means which counts said clock pulses from said clock pulse generating means and, upon each coincidence of the count value with said number of clock pulses represented by said correcting sampling period represented, in turn, by said correcting sampling period display data, outputs one wave as one wave of said sampling signal.

* * * * *